(12) United States Patent
Crean

(10) Patent No.: US 6,290,284 B1
(45) Date of Patent: *Sep. 18, 2001

(54) TRAVEL TRAILER WITH EXTENDABLE TWO LEVEL BATHROOM AND BEDROOM

(75) Inventor: Johnnie R. Crean, Chino, CA (US)

(73) Assignee: Alfa Leisure, Inc., Chino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/704,197

(22) Filed: Oct. 31, 2000

Related U.S. Application Data

(63) Continuation-in-part of application No. 09/283,708, filed on Apr. 1, 1999, now Pat. No. 6,170,903.
(60) Provisional application No. 60/209,449, filed on Jun. 1, 2000.

(51) Int. Cl.$^7$ ........................................... B60P 3/335
(52) U.S. Cl. .................. 296/168; 296/26.13; 296/26.12; 296/171; 52/67
(58) Field of Search .................................. 296/168, 171, 296/175, 176, 165, 26.12, 26.13, 26.01; 52/67, 66

(56) References Cited

U.S. PATENT DOCUMENTS

| Re. 32,262 | 10/1986 | Stewart . |
| 2,150,615 | 3/1939 | Sword . |
| 2,177,394 | 10/1939 | Pierce . |
| 2,225,319 | 12/1940 | Rollo . |
| 2,606,057 | 8/1952 | Johnson . |
| 2,704,223 | 3/1955 | Houdart . |
| 2,876,035 | 3/1959 | Houdart . |
| 3,106,750 | 10/1963 | Jarman . |
| 3,341,986 | 9/1967 | Brosig . |
| 3,572,809 | 3/1971 | Buland . |
| 3,608,954 | 9/1971 | Lynd . |
| 3,719,386 | 3/1973 | Puckett et al. . |
| 3,740,088 | 6/1973 | Ratcliff . |
| 3,801,138 | * 4/1974 | Quick ................................... 280/478 |
| 3,850,470 | 11/1974 | Trelle . |
| 4,457,554 | * 7/1984 | Fuisz et al. ........................... 296/179 |
| 4,480,866 | 11/1984 | Komatsu . |
| 4,500,132 | 2/1985 | Yoder . |
| 4,550,946 | 11/1985 | Hanemaayer . |
| 4,841,897 | * 6/1989 | Claflin ................................. 296/168 |
| 4,955,661 | 9/1990 | Mattice . |
| 4,960,299 | 10/1990 | Steadman . |
| 5,061,001 | 10/1991 | Madden et al. . |
| 5,090,749 | 2/1992 | Lee . |
| 5,171,056 | 12/1992 | Faludy et al. . |
| 5,237,782 | 8/1993 | Cooper . |
| 5,248,005 | * 9/1993 | Mochizuki ............................. 175/85 |
| 5,280,990 | * 1/1994 | Rinard ............................... 296/180.5 |
| 5,291,701 | 3/1994 | Delacollette et al. . |

(List continued on next page.)

Primary Examiner—Joseph D. Pape
Assistant Examiner—Kiran B. Patel
(74) Attorney, Agent, or Firm—Knobbe, Martens, Olson & Bear, LLP

(57) ABSTRACT

A recreational travel trailer comprising a main housing which encloses a living space having multiple floor levels, and a two level extendable housing having a deployed configuration and an extended configuration. The extendable housing is movably positioned within an opening in the main housing so that a first floor of the extendable housing is positioned adjacent to a first floor of the main housing and so that a second floor of the extendable housing is positioned adjacent to a second floor of the main housing. In the deployed configuration, the extendable housing extends through the opening of the main housing so as to increase the enclosed space within the trailer. In the retracted configuration, the extendable housing is substantially positioned within the main housing so as to provide the main housing with a shape and size that is suitable for being towed on a public road. The trailer is further comprised of an actuator assembly having a linear actuator which moves the two level extendable housing.

22 Claims, 14 Drawing Sheets

U.S. PATENT DOCUMENTS

| | | |
|---|---|---|
| 5,374,094 | 12/1994 | Smith et al. . |
| 5,620,224 * | 4/1997 | Dibiagio et al. ..................... 296/165 |
| 5,634,683 | 6/1997 | Young . |
| 5,658,031 | 8/1997 | DiBiagio et al. . |
| 5,658,032 | 8/1997 | Gardner . |
| 5,673,962 | 10/1997 | Miaieli et al. . |
| 5,706,616 | 1/1998 | Fernandez . |
| 5,746,473 | 5/1998 | Crean . |
| 5,788,306 * | 8/1998 | Dibiagio et al. ..................... 296/165 |
| 5,800,002 * | 9/1998 | Tiedge et al. ........................ 296/171 |
| 5,833,294 * | 11/1998 | Williams et al. ..................... 296/26 |
| 5,902,001 * | 5/1999 | Schneider .......................... 296/26.13 |
| 5,934,026 * | 8/1999 | Green ................................ 296/26.01 |
| 6,007,142 * | 12/1999 | Gehman et al. ..................... 296/171 |
| 6,170,903 * | 1/2001 | Crean .................................. 296/168 |

* cited by examiner

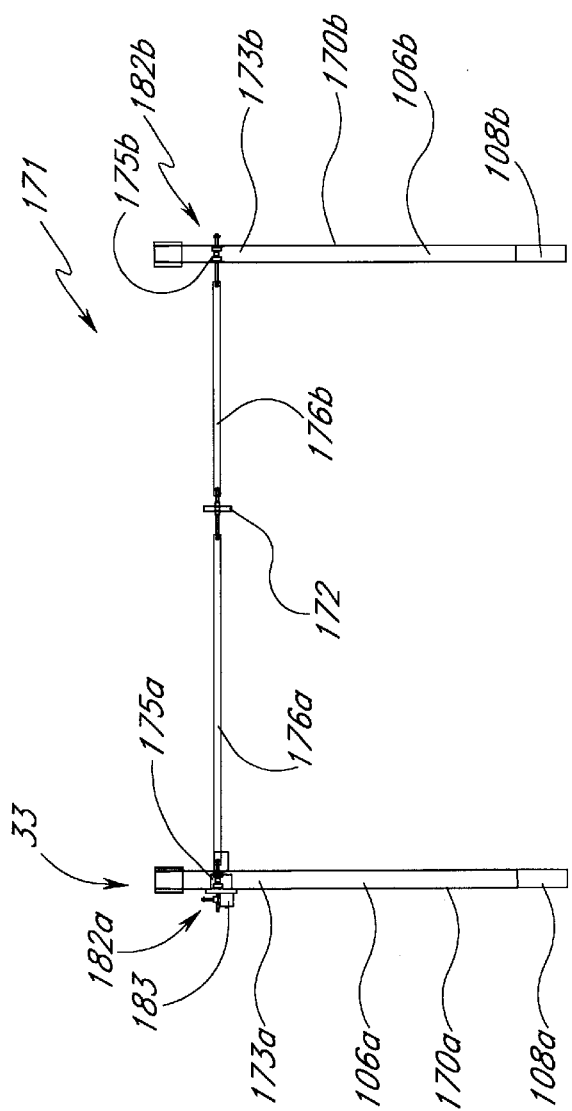
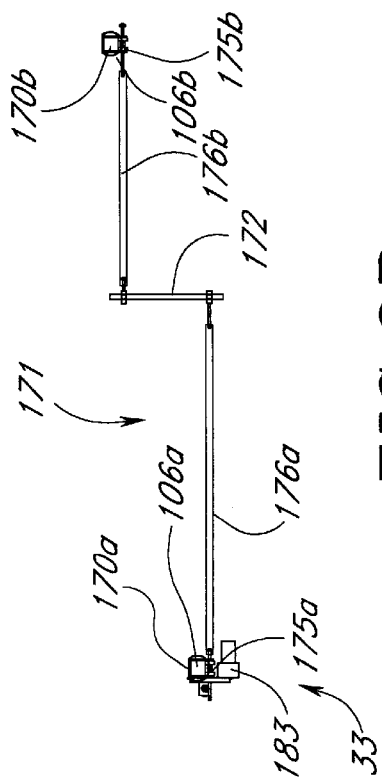
FIG.3A
FIG.3B

TRAVEL TRAILER WITH EXTENDABLE TWO LEVEL BATHROOM AND BEDROOM

RELATED APPLICATIONS

This application is a continuation-in-part of U.S. application Ser. No. 09/283,708 filed Apr. 1, 1999 now U.S. Pat. No. 6,170,903, and also claims the benefit of U.S. Provisional Application No. 60/209,449 filed Jun. 1, 2000.

BACKGROUND OF THE INVENTION

1. Field of the Invention

The present invention relates to travel trailers and in particular relates to travel trailers that are adapted to expand in size so as to increase the effective interior area of the travel trailer.

2. Description of the Related Art

Recreational travel trailers are becoming increasingly popular with people who wish to retain the comforts and conveniences of home while spending extended periods of time away at remote locations. In particular, a recreational travel trailer is a modestly priced mobile structure which can be towed behind a passenger vehicle, such as a truck, and forms an enclosed interior living space so as to provide a shelter for individuals. In more elaborate configurations, the travel trailer typically includes amenities such as a bedroom, a bathroom with a sink and a flushing toilet, a kitchen with a refrigerator, stove, and sink, and a generously sized living area with reclining chairs and an entertainment center. Furthermore, a travel trailer can be easily parked at a wide variety of locations so that users can enjoy the amenities of the travel trailer at their favorite destination. Consequently, people who use travel trailers can usually be assured of a comfortable living environment at their preferred destination without having to rely on the availability of suitable hotels.

In response to consumer demand, manufactures of travel trailers have developed increasingly larger travel trailers. However, state and federal laws limit the dimensions of travel trailers that can be transported on public roads, thereby limiting the living space within the travel trailer. In particular, current regulations specify a maximum length, otherwise known as the maximum allowed length, of highway bound travel trailers to be no greater than 40 feet. Furthermore, current regulations specify a maximum width, otherwise known as the maximum allowed width, of highway bound travel trailers to be no greater than 8.5 feet and the maximum deployed area of no more than 400 square feet. Thus, the travel trailer industry has devoted considerable resources to develop improved travel trailers so as to increase the living space of the travel trailer in a manner that is consistent with the forgoing size restrictions.

Consequently, manufacturers have developed travel trailers with an extendable housing that provides the user with a supplemental living space when the travel trailer is parked. In particular, the extendable housing is adapted to extend into a deployed configuration during the time that the travel trailer is parked so that the living space within the travel trailer is increased by an amount which is substantially equal to the supplemental living space of the extendable housing. Furthermore, the extendable housing is adapted to retract into a retracted configuration during the time that the travel trailer is being towed so that the traveling dimensions of the travel trailer are within the maximum allowed width and length.

The typical extendable housing is positioned within an opening of the main housing of the travel trailer and is comprised of a plurality of walls that form the supplemental living space therein and an opening that provides access to the supplemental living space. In particular, the walls of the typical extendable housing are comprised of a lower horizontal wall that forms a single level planer floor which substantially aligns with an adjacent floor of the travel trailer and an upper horizontal wall that forms a single level planer ceiling which substantially aligns with an adjacent ceiling of the travel trailer. Furthermore, the extendable housing is comprised of an outer vertical wall that is adapted to align with an outer wall of the travel trailer while the extendable housing is placed in the retracted configuration, and a pair of horizontal side walls that join the upper and lower horizontal walls and the outer vertical wall together.

According to state of the prior art, the known extendable housing is typically mounted on a pair of movable support rail assemblies which are positioned at a common elevation so as to provide movement of the extendable housing with respect to the travel trailer. In particular, each support rail assembly is typically comprised of a fixed member which is fixedly attached to the frame of the travel trailer and a sliding member which telescopes from the fixed member and couples with the extendable housing so that the extendable housing moves with the sliding member of each support rail assembly. Furthermore, the sliding member of each of the support rail assemblies is displaced with respect to the fixed member by an actuator assembly that typically comprises either an electrically powered linear rack and pinion drive mechanism or a hydraulic assembly which moves each of the sliding members so that the extendable housing remains in an aligned state with respect to the travel trailer during the movement process. Moreover, the actuator assembly typically further includes push button control so that the user can conveniently place the extendable housing in either the retracted or the deployed configuration.

Such an extendable housing, when in the retracted configuration, is positioned so that the outer vertical wall aligns with the side wall of the travel trailer and so that the remaining walls, including the lower horizontal wall, of the extendable housing are positioned within the interior living space of the travel trailer. Consequently, the travel trailer is able to have a more aerodynamic shape such that the width and length of the travel trailer are within the maximum allowed width and length.

However, when the extendable housing is placed into the deployed configuration, the extendable housing extends from the travel trailer so that the walls of the extendable housing extend from the opening of the housing of the travel trailer so as to align the opening of the extendable housing with the opening of the side wall of the travel trailer. Consequently, the floor of the extendable housing extends through the opening of the housing so that the effective living area of the travel trailer is increased. Furthermore, the walls of the extendable housing effectively become exterior walls of the travel trailer so that the interior living space of the travel trailer remains enclosed.

Typically, the largest variety of travel trailers, otherwise known as fifth wheel travel trailers, are manufactured so that the weight of the trailer is partially supported by a plurality of wheels that extend from a chassis of the trailer and partially supported at the front by the towing vehicle. In particular, such travel trailers are comprised of a raised front section that is adapted to substantially extend over a supporting portion of the towing vehicle and a lowered rear section that is positioned above the plurality of wheels of the travel trailer. Furthermore, such travel trailers may further be comprised of a midsection that encloses a portion of a plumbing assembly which includes a fresh water storage tank and a waste water storage tank. Thus, typical fifth wheel travel trailers are typically formed with multiple levels which often include a rear section having a lowered floor area, a front section having a raised floor area, and a middle section having an intermediately elevated floor area.

In the typical fifth wheel travel trailer, the living space is typically segmented along the boundaries between the lower, middle, and upper sections of the travel trailer. In particular, since the rear section is closest to the ground and since the rear section is the largest of the three sections, the rear section typically comprises the living room and kitchen that are both accessible from the outside by an entry door positioned along a side wall of the housing of the travel trailer that opens into the lower level. Furthermore, since the middle section often comprises the plumbing assembly, the middle section often comprises the bathroom. Moreover, since the front section has the least amount of headroom and is the most remote of all three sections, the front section often comprises the bedroom.

In known fifth wheel travel trailers having extendable housings, the extendable housings are somewhat limited in that they extend from only a single section of the travel trailer. In particular, known extendable housings extend from either the rear section, the midsection, or the front section of the trailer. For example, the typical extendable travel trailer is comprised of a first extendable housing having a single level floor that extends from a first opening in the side wall of the travel trailer in the vicinity of the rear section so as to increase the size of the living room. Further, the typical trailer also includes a second extendable housing having a single level floor that extends from a second opening of the side wall of the travel trailer in the vicinity of the front section so as to increase the size of the bedroom.

Although such recreational travel trailers provide a significant increase in living space, the increase is not as great as it could be. In particular, since the known extendable housing can only extend from a single level floor of the recreational travel trailer, the width of the known extendable housing is limited by the dimensions of the corresponding trailer section. Consequently, such extendable housings provide a supplemental living space that is sometimes relatively narrow in size, thereby preventing relatively large items from being positioned within the extendable housing. As most extendable housings in trailers do not expand bathroom areas, this area of the trailers is often the most compact. This creates problems for the occupant of the trailer as the limited area of the bathroom must also be occupied by the bathroom fixtures. Hence, there is a significant limitation of floor space within the bathroom. Alternatively, floor space is increased somewhat by an removal of storage facilities, wardrobes and the like, positioned within the bathroom area. Hence, the limitations in the space available or storage available for the bathroom makes it more difficult for the occupant to use the bathroom for dressing, putting on makeup and the like.

From the foregoing, therefore, it will be appreciated that there is a need for an improved travel trailer that can be configured with a living space that is greater than that of travel trailers known in the art. In particular, there is a need for an improved travel trailer that comprises an improved extendable housing that can be manipulated between a retracted configuration and a deployed configuration so that the extendable housing encompasses multiple sections of the travel trailer so as to increase of the width of the extendable housing over that of extendable housings known in the art. To this end, there is a need for the improved extendable housing to include a multilevel floor so as to enable the extendable housing to encompass multiple sections of the travel trailer which could include a bathroom and a bedroom in tandem.

SUMMARY OF THE INVENTION

The aforementioned needs are satisfied by the present invention which, according to one aspect, is a travel trailer comprising a chassis, a set of rotatable wheels attached to the chassis so as to allow the trailer to travel on a roadway, and a floor disposed above the chassis. The floor defines an inner living space of the trailer and has a first vertical level positioned at a first height above the roadway and a second vertical level positioned at a second height above the roadway. The travel trailer further comprises a main housing that includes a plurality of walls disposed above the chassis so as to enclose the inner living space of the trailer. The travel trailer further comprises an extendable housing disposed adjacent a first wall of the plurality of walls of the main housing. The extendable housing includes a floor having a first and second level and a plurality of walls extending from the floor so as to define a supplementary space therein, wherein the first and second level of the floor of the extendable housing are respectively positioned adjacent the first and second vertical levels of the floor of the trailer disposed above the chassis. The extendable housing is movable between (a) a first position such that an outer wall of the plurality of walls of the extendable housing is disposed adjacent a plane of the first wall and (b) a second position wherein the outer wall of the extendable housing is disposed outward from the plane of the first wall. The travel trailer further comprises a movement mechanism coupled to the extendable housing. The movement mechanism moves the extendable housing between the first and second positions and comprises a single linear actuator.

In one embodiment, the first room is a bedroom disposed at a front end of the trailer and the second room is a bathroom disposed behind the bedroom. Furthermore, the second section of the slide-out assembly comprises a storage compartment.

In another aspect, a travel trailer comprises a chassis, a set of rotatable wheels attached to the chassis so as to allow the trailer to travel on a roadway, and a main housing disposed above the chassis so as to define an inner living space of the trailer. The travel trailer further comprises a multilevel floor disposed above the chassis which includes first and second floor levels disposed at respective first and second heights above the roadway. The inner living space comprises first and second rooms respectively disposed above the first and second floor levels. The travel trailer further comprises a slide-out assembly having a first and second section, wherein the slide-out assembly is movable between (a) a retracted position such that the first and second sections of the slide-out assembly overlap first and second access spaces of the first and second rooms of the inner living space and (b) a deployed position wherein the first and second sections of the slide-out assembly are respectively displaced from the first and second access spaces of the first and second rooms of the inner living space of the travel trailer. The travel trailer further comprises an actuator assembly for moving the slide-out assembly between the retracted and deployed positions, wherein the actuator assembly comprises a single linear actuator.

In yet another aspect, a fifth wheel trailer comprises a set of wheels, a chassis attached to the set of rotatable wheels so as to permit movement of the chassis over the ground, and a main housing. The chassis and the main housing define a three level enclosed living space with a first level located at a first height above the ground, a second level located at a second height, greater than the first height above the ground and a third level located at a third height, greater than the second height above the ground wherein the second level defines a second area of available floor space and wherein the third level defines a third area of available floor space. The fifth wheel trailer further comprises an extendable housing attached to the main housing adjacent the second and third levels of the main housing and defines second and third extendable floor spaces wherein the extendable housing is movable between a retracted position and an extended position. The fifth wheel trailer further comprises a fixture positioned on the second extendable floor space of the extendable housing wherein the extendable housing is attached to the main housing such that the fixture occupies the second area of available floor space when the extendable housing is in the retracted position and wherein the fixture is displaced from the second area of available floor space when the extendable housing is in the extended position.

In still yet another aspect, a travel trailer comprises a chassis, a set of rotatable wheels attached to the chassis so as to allow the trailer to travel on a roadway, a main housing disposed above the chassis so as to define an inner living space of the trailer, and a multilevel floor disposed above the chassis. The multilevel floor comprises first and second floor levels disposed at respective first and second heights above the roadway. The inner living space comprises first and second rooms respectively disposed above the first and second floor levels. The travel trailer further comprises a slide-out assembly having an extendable housing and a storage compartment, wherein the slide-out assembly is moveable between (a) a retracted position such that the extendable housing overlaps an access space of the first room and the storage compartment overlaps an access space of the second room, and (b) a deployed position such that the extendable housing is displaced from the access space of the first room and the storage compartment is displaced from the access space of the second room. The travel trailer further comprises an actuator assembly for moving the slide-out assembly between the retracted and deployed positions. The actuator assembly comprises a single linear actuator that applies a force at a first region on the slide-out assembly when moving the slide-out assembly such that the single linear actuator simultaneously moves the extendable housing and the storage compartment. The single linear actuator comprises a base which is fixedly mounted to the chassis and an elongate rod which movably extends from the base. The slide-out assembly further comprises a rigid plate coupled to the rod of the actuator assembly. The rigid plate rigidifies the slide-out assembly so that the slide-out assembly is less likely to contort when moved between the retracted and deployed positions.

Another aspect of the invention is a travel trailer that comprises a chassis having first, second, and third horizontal sections vertically offset from each other, a set of rotatable wheels attached to the chassis so as to allow the trailer to travel on a roadway, and a main housing disposed above the chassis so as to define an inner living space therein. The inner living space comprises a bedroom having occupied and unoccupied portions disposed above the first horizontal section of the chassis, a bathroom having occupied and unoccupied portions disposed above the second horizontal section of the chassis, and a living room disposed above the third section of the chassis. The main housing includes a first longitudinally disposed vertical wall having an opening that extends into the bedroom and bathroom. The travel trailer further comprises a slide-out housing disposed within the opening of the first vertical wall of the main housing, wherein the slide-out housing comprises a longitudinally disposed vertical wall and a plurality of laterally disposed horizontal walls extending from the vertical wall so as to define an auxiliary space therein. The slide-out assembly is moveable between (a) a retracted position such that the vertical wall of the slide-out housing is substantially aligned with the first vertical wall of the main housing and the unoccupied portions of the bedroom and bathroom are reduced, and (b) a deployed position such that the vertical wall of the slide-out housing is outwardly disposed with respect to the first vertical wall of the main housing. The auxiliary space includes a bedroom section disposed adjacent the bedroom and a bathroom section disposed adjacent the bathroom, wherein the bedroom section comprises a wardrobe closet and the bathroom section comprises a fixture such that deploying the slide-out housing displaces the wardrobe closet away from the bedroom and displaces the fixture away from the bathroom so as to increase the unoccupied portions of the bedroom and bathroom.

From the foregoing, it should be apparent that the travel trailer of the present invention provides increased storage space without diminishing the living space of the trailer. Furthermore, the travel trailer of the present invention utilizes a simple yet effective actuator assembly that can be manufactured at low cost. These and other objects and advantages of the present invention will become more apparent from the following description taken in conjunction with the accompanying drawings.

BRIEF DESCRIPTION OF THE DRAWINGS

FIG. 3A is an overhead plan view of a two level actuator assembly of the travel trailer of FIG. 1 that actuates the two level extendable housing between the retracted configuration and the deployed configuration;

FIG. 3B is a side elevational view of the actuator assembly of FIG. 3A;

DETAILED DESCRIPTION OF THE PREFERRED EMBODIMENT

Figure 1:
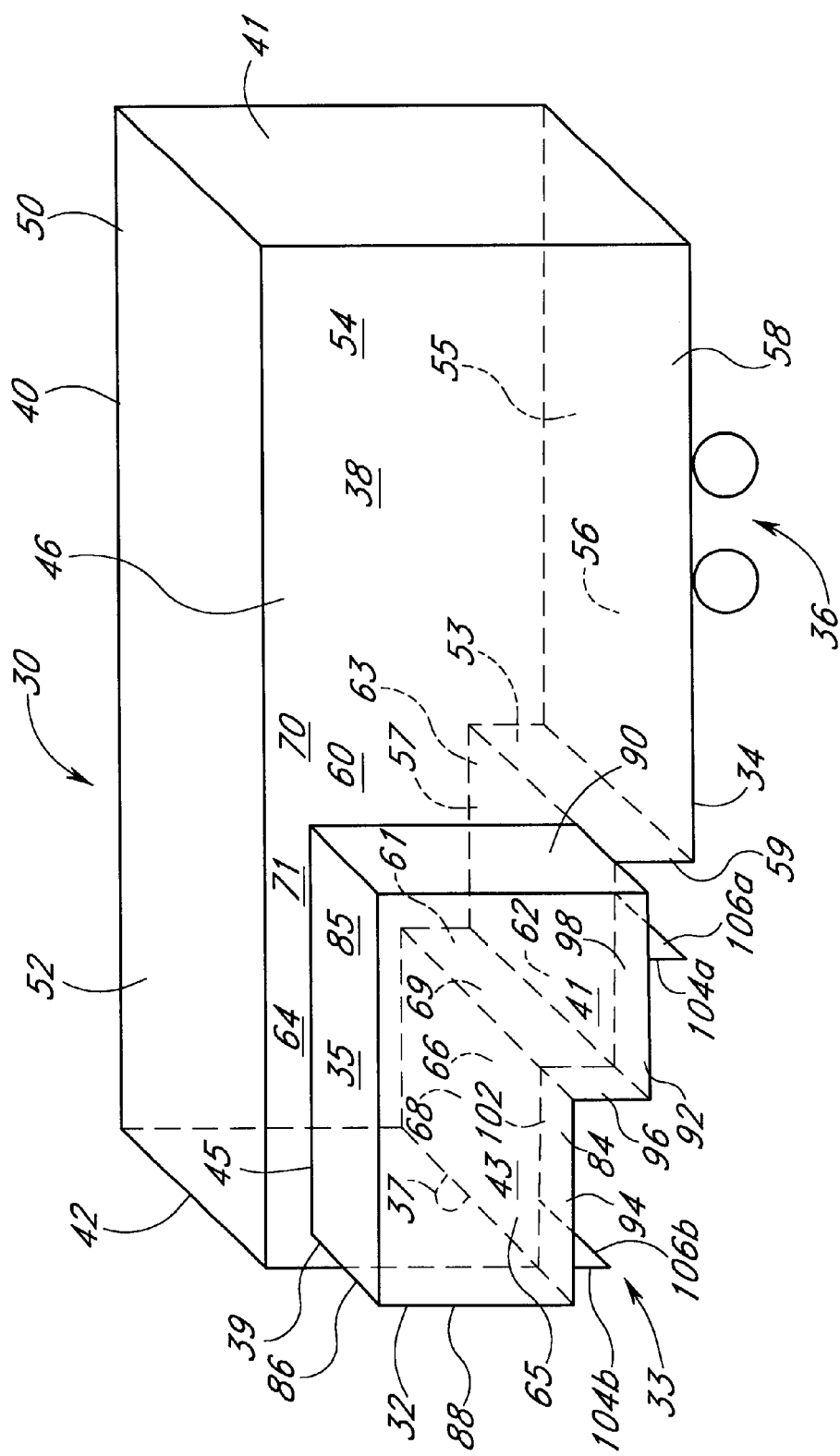
FIG. 1 is a perspective view of a recreational travel trailer of the present invention that comprises a two level extendable housing.

Reference will now be made to the drawings wherein like numerals refer to like parts through out. In particular, FIG. 1 schematically illustrates a recreational fifth wheel travel trailer 30 comprised of a main housing 40 and a two level extendable housing 32, wherein the extendable housing 32 is shown extending from an opening 39 of the main housing 40 in a deployed configuration. As will be described in greater detail below, the two level extendable housing 32 can either be placed in the deployed configuration so as to effectively increase a living space 38 of the trailer 30 or be placed in a retracted configuration so as to provide that trailer 30 with a more suitable size and shape for being towed on a public road. Furthermore, although the preferred embodiment of FIG. 1 includes the extendable housing 32 that extends from the left side of the trailer 30, it will be appreciated that the extendable housing 32 could be adapted to extend from the right side of the trailer 30 in another embodiment.

In this application, the adjectives "front", "rear", "left", "right", "inboard", "outboard", "longitudinal", and "lateral" will be frequently used to indicate the spatial relationship between many of the elements of the trailer 30. In particular, the adjective front is used to indicate that the corresponding element is positioned proximal to a front end of the trailer 30 and the adjective rear is used to indicate that the corresponding element is positioned proximal to a rear end of the trailer 30, wherein the trailer 30 preferably travels on a road with the front end leading and the rear end lagging. Furthermore, the adjectives left and right are defined with respect to an observer who is looking at the trailer 30 along a direction that extends from the rear end of the trailer 30 to the front end of the trailer and are used to indicate that the corresponding element is either positioned adjacent to the left side of the trailer 30 or adjacent to the ride side of the trailer 30. Moreover, the adjective inboard refers to an element being positioned proximal to a medial line that extends from the rear end of the trailer 30 to the front end of the trailer 30 and the adjective outboard refers to an element being positioned distally from the medial line. Additionally, the adjectives longitudinal and lateral are used to indicate direction, wherein longitudinal refers to a horizontal direction that extends between the rear and front ends of the trailer 30, and wherein lateral refers to a horizontal direction that extends between the left and right sides of the trailer 30.

As generally shown in FIG. 1, the trailer 30 further comprises a frame or chassis 34 that structurally supports the trailer 30. Essentially, the frame 34 forms a multilevel structure and is constructed from conventional structural members in a manner known in the art so that the frame 34 structurally supports the main housing 40 of the trailer 30. In the preferred embodiment, the frame 34 is comprised of a rear horizontal platform 58, a front horizontal platform 65, and a middle horizontal platform 63 interposed therebetween. However, it will be appreciated that, in other embodiments, the frame 34 could be comprised of a different number of platforms. Furthermore, the frame 34 comprises a rear vertical riser 59 that joins the rear horizontal platform 58 with the middle horizontal platform 63 so that the platform 63 is elevated above the platform 58. Moreover, the frame 34 comprises a front vertical riser 61 that joins the middle horizontal platform 63 with the front horizontal platform 65 so that the platform 65 is elevated above the platform 63.

In the preferred embodiment, the platforms 58, 63, and 65 of the frame 34 are formed from steel structural members. However, it will be appreciated that frame 34 could be constructed in alternative manner in other embodiments of the invention. For example, the rear platform, in an alternative embodiment, could be formed of steel members and extended in length so as to join with a single steel riser that joins with the front platform formed of steel. Furthermore, the middle platform, in this alternative embodiment, could comprise a wooden structure that mounts at the front of the rear platform.

As generally shown in FIG. 1, the main housing 40 is mounted above the frame 34 and is essentially formed of a plurality of planer walls that are joined together in a known manner and mounted to the frame 40 in a known manner so as to form the space 38 above a plurality of floor levels. In particular, the main housing 40 includes a front vertical wall 42, a rear vertical wall 44, a left side or drivers side vertical wall 46, a right side or passenger side vertical wall 50, and an overhead vertical wall 52 that all join together in a mutually orthogonal manner to form a substantially rectangular shaped enclosure having the living space 38 formed therein. Furthermore, the main housing 40 is further comprised of a rear lower horizontal wall 55, a middle lower horizontal wall 57, and an front lower horizontal wall 68 that are mounted directly above the rear platform 58, middle platform 63, and front platform 65, respectively, of the frame 34.

Moreover, the upper surfaces of the rear, middle, and front horizontal walls 55, 57, and 68 respectively form a rear floor 56, a middle floor 62, and a front floor 66. In particular, the middle floor 62 is elevated above the rear floor 56 and separated from the rear floor 56 by a rear step 53 that rises from the rear floor to the middle floor. Furthermore, the front floor 66 is elevated above the middle floor 62 and separated from the middle floor 62 by a front step 69 that rises from the middle floor 62 to the front floor 66. Consequently, the living space 38 formed within the main housing 40 is segmented into a rear space 54 that encompasses the rear floor 56, a middle space 60 that encompasses the middle floor 62, and a front space 64 that encompasses the front floor 66.

As generally shown in FIG. 1, the trailer 30 further comprises a known wheel assembly 36 having a plurality of rotatable wheels that attaches to the frame so as to enable the trailer 30 to be transported on a road. Furthermore, the trailer 30 further comprises a known male hitch assembly 37 at the front of the trailer 30 that couples with a known female hitch assembly of a towing vehicle so that the trailer 30 can be towed by the towing vehicle.

As generally shown in FIG. 1, the two level extendable housing 32 that is adapted to extend from the main housing 40 of the trailer 30 is formed of a plurality of walls that join together to form a supplemental living space 35 therein. In particular, the housing 32 comprises an outboard vertical wall 84, an overhead horizontal wall 86, a front lateral vertical wall 88, a rear lateral vertical wall 90, a rear lower horizontal wall 92 having a lower floor 98 formed thereon, a front lower horizontal wall 94 having an upper floor 102 formed thereon, and a middle lateral vertical wall 96 that collectively join together in a substantially orthogonal manner. Specifically, the middle vertical wall 96 vertically offsets the rear lower horizontal wall 92 from the front lower horizontal wall 94 so that the upper floor 102 is elevated above the lower floor 98. Furthermore, the extendable housing 32 includes an inboard opening 85 that allows access to the supplemental living space 35, wherein the opening 85 is positioned opposite of the outboard vertical wall 84. Moreover, the supplemental living space 35 comprises a lower space 41 that encompasses the lower floor 98 and an upper space 43 that encompasses the upper floor 102 of the extendable housing 32. As will be described in greater detail below, the lower space 41, in the preferred embodiment, forms a part of a bathroom area 73 and the upper space 43 forms a part of a sleeping area 77 of the trailer 30.

As generally shown in FIG. 1, the main housing 40 of the trailer 30 includes the opening 39 that enables the two level extendable housing 32 to extend from the main housing 40. In particular, the opening 39 is formed with a perimeter 45 having a shape that enables the two level extendable housing 32 to extend from the opening 39 when the extendable housing 32 is placed into the deployed configuration. Moreover, the opening 39 is formed with a shape that provides a substantially airtight seal when the extendable housing 32 is placed in the retracted configuration. Furthermore, the opening 39 is positioned adjacent to the middle and front spaces 60 and 64 of the trailer 30 so as to allow the extendable housing to extend into and out of the middle and front spaces 60 and 64 of the trailer 30.

As generally shown in FIG. 1, the two level extendable housing 32, in the deployed configuration, extends through the opening 39 of the main housing 40 along a direction that is substantially perpendicular to the left side vertical wall 46 so that the opening 85 of the extendable housing 32 substantially aligns with the opening 39 of the main housing 40 so as to provide the trailer 30 with an expanded interior middle space 70 and an expanded interior front space 71. In particular, the extendable housing 32 is positioned so that the middle floor 62 of the main housing 40 extends into the lower floor 98 of the extendable housing 32 so as to combine the middle space 60 of the main housing 40 with the lower space 41 of the extendable housing 32 into the expanded middle space 70. Furthermore, the extendable housing 32 is positioned so that the front floor 66 of the main housing 40 extends into the upper floor 102 of the extendable housing 32 so as to combine the front space 64 of the main housing 40 with the upper space 43 of the extendable housing 32 into the expanded front space 71.

As schematically shown in FIG. 1, the two level extendable housing 32 is coupled to an actuator assembly 33 that moves the two level housing 32 between the deployed configuration and the retracted configuration. In the preferred embodiment, the actuator assembly 33 is comprised of a rear horizontal slidable rail 106a having a rear upwardly extending vertical bracket 104a at an outboard end of the rail 106a and a front slidable rail 106b having a front upwardly extending vertical bracket 104b at an outboard end of the rail 106b, wherein the rear and front brackets 104a and 104b attach to the extendable housing 32 so that movement of the rails 106a and 106b produce a corresponding movement of the extendable housing 32 between the extended and retracted positions.

As schematically shown in FIG. 1, the rails 106a and 106b laterally extend from the frame 40 along different horizontal planes. In particular, the rail 106a extends from the middle platform 63 of the frame 34 and is positioned beneath the rear horizontal wall 92 of the extendable housing 32 so that the rear bracket 104a can attach to the extendable housing 32 in a manner which will be described in greater detail below. Similarly, the rail 106b extends from the front platform 65 of the frame 34 and is positioned beneath the front horizontal wall 94 of the extendable housing 32 so that the front bracket 104b can attach to the extendable housing 32. As will be described in greater detail below in connection with FIGS. 3A–3B, the actuator assembly 33 is further comprised of a two level drive assembly 47 that moves the vertically offset rails 106a and 106b in a lateral manner so as to move the extendable housing 32 between the deployed configuration and the retracted configuration.

Figure 2A:
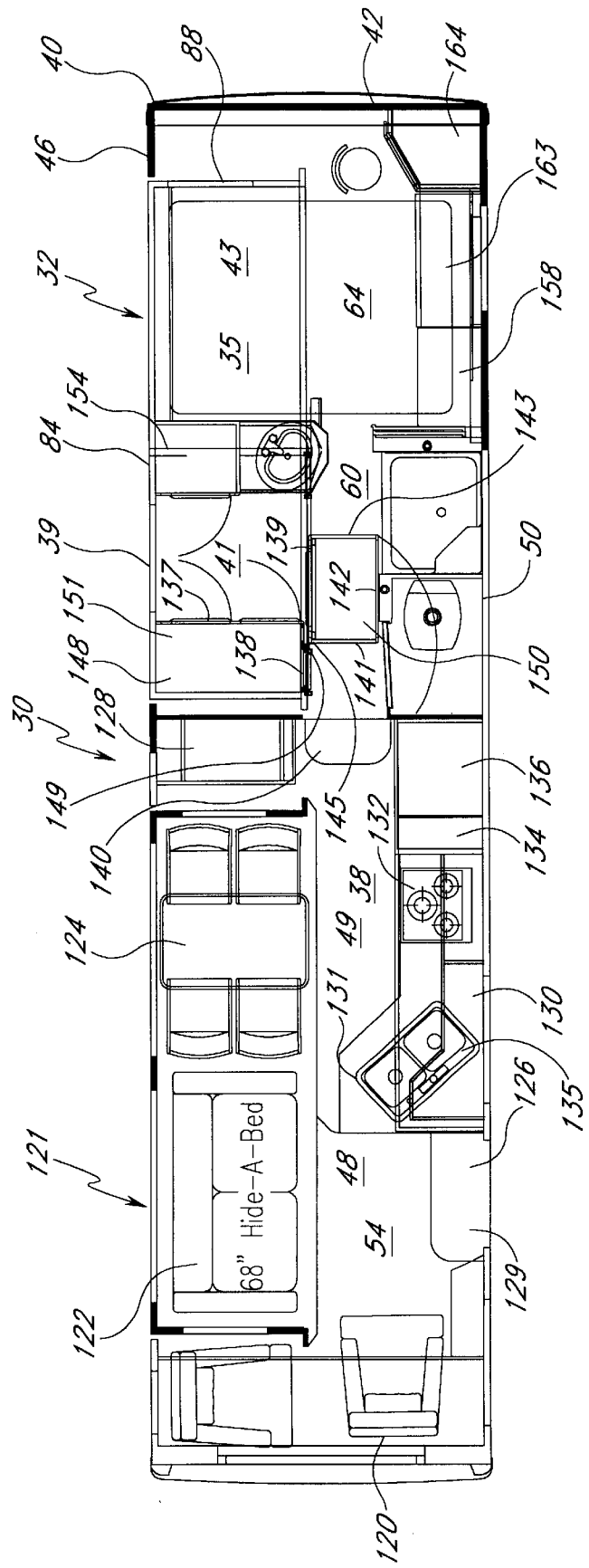
FIG. 2A is an overhead plan view of the travel trailer of FIG. 1 showing the two level extendable housing in a retracted configuration.
Figure 2B:
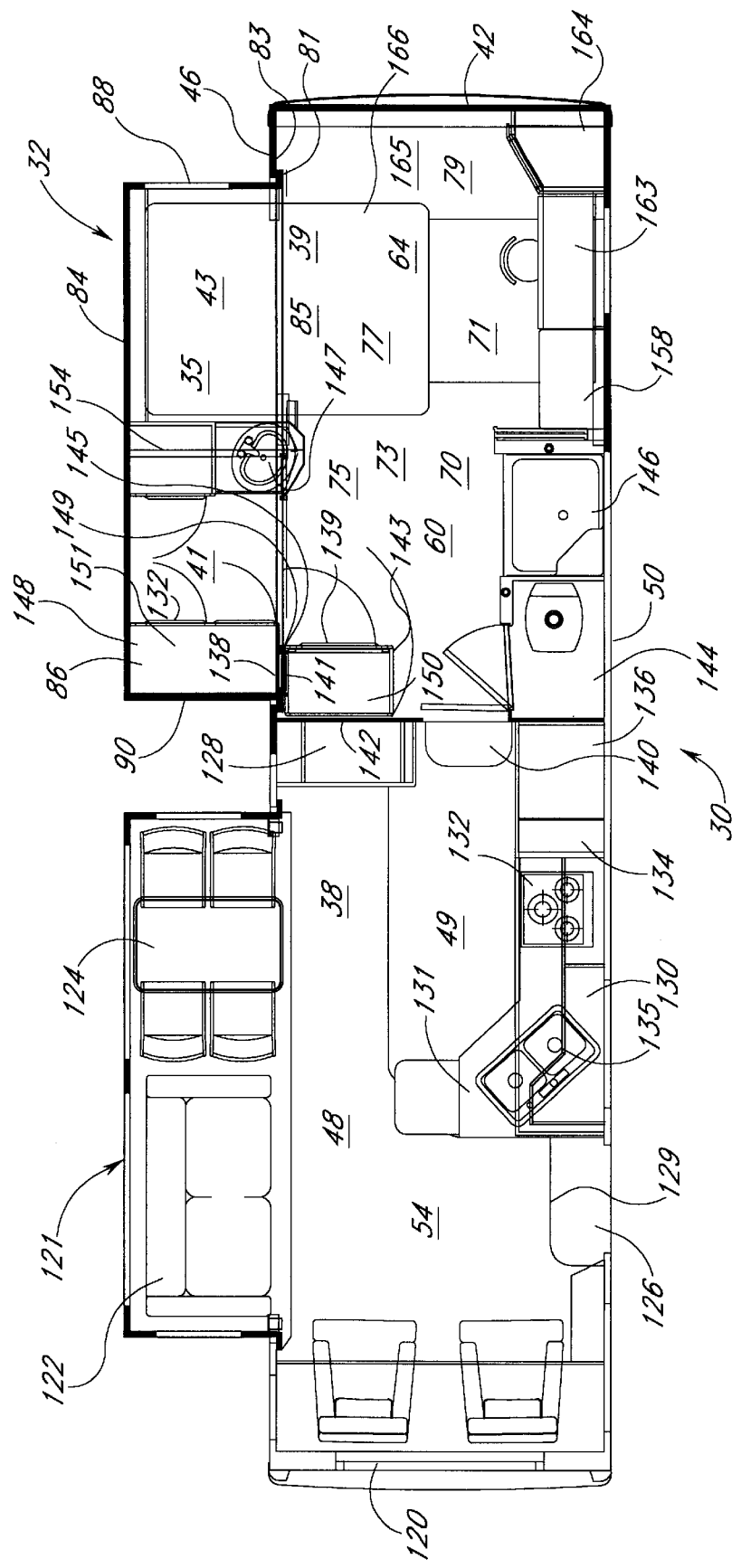
FIG. 2B is an overhead plan view of the travel trailer of FIG. 1 showing the two level extendable housing in a deployed configuration.

Reference will now be made to FIGS. 2A and 2B which provide a detailed plan view of the living space 38 within the trailer 30 of FIG. 1. In particular, FIG. 2A illustrates the trailer 30 with the extendable housing 32 in the retracted configuration and FIG. 2B illustrates the trailer 30 with the extendable housing 32 in the deployed configuration. Moreover, in FIGS. 2A and 2B, the front of the trailer 30 is shown on the right hand side of the page and the rear of the trailer 30 is shown in the left hand side of the page.

As shown in FIG. 2A, the extendable housing 32, in the retracted configuration, extends into the main housing 40 so that the extendable housing 32 is substantially positioned within the middle and front spaces 60 and 64 of the living space 38 of the trailer 30. Consequently, the outboard vertical wall 84 of the extendable housing 32 is aligned with the opening 39 of the main housing 40 so as to form the trailer 30 with a more aerodynamic shape and so as to reduce the effective width of the trailer 30 while the trailer is being towed.

As shown in FIG. 2B, the extendable housing 32, in the deployed configuration, extends out of the opening 39 of the left vertical side wall 46 of the main housing 40 so that the opening 85 of the extendable housing 32 aligns with the opening 39 of the main housing 40. Thus, the lower and upper spaces 41 and 43 of the supplemental living space 35 of the extendable housing 32 combine with the middle and front spaces 60 and 64 of the living space 38 of the housing 40 to form the expanded middle and front spaces 70 and 71 of the trailer 30.

As shown in FIGS. 2A and 2B, the extendable housing 32 further comprises a lip 81 that outwardly extends from the inboard edges of the front, overhead, and rear walls 88, 86, and 90 of the extendable housing 32 in a substantially orthogonal manner. In particular, when the extendable housing 32 is placed in the deployed configuration of FIG. 2B, the lip 81 flushly contacts an inner surface 83 of the main housing 40 adjacent the opening 39 of the left side vertical wall 46 of the main housing 40 so as to partially support the extendable housing 32 in the deployed configuration. As will be described below in connection to FIG. 4B, the actuator assembly 33 provides additional support to the extendable housing 32 in the extended position.

As shown in FIGS. 2A and 2B, the preferred embodiment of the trailer 30 further comprises a conventional single level extendable housing 121 having a deployed configuration and a storage configuration. In particular, the single level extendable housing 121, when in the deployed configuration as shown in FIG. 1B, extends through the main housing 40 so as to increase the rear space of the trailer 30. Furthermore, the single level extendable housing 121, when in the retracted configuration as shown in FIG. 1A, is substantially positioned within the main housing 40 so as to provide the trailer 30 with a shape and size that is more suitable for traveling.

As shown in FIGS. 2A and 2B, the rear space 54 of the trailer 30 includes a living room area 48 and a kitchen area 49. In particular, the living room area 48 includes a plurality of recliner chairs 120, a hide-a-bed 122, a set of dining furniture 124, an entertainment center 128 for storing a television, and an entry area 129 adjacent an entry door 126 which is positioned within the right side vertical wall 50 of the main housing 40. Moreover, the hide-a-bed 122 and the set of dining furniture 124 are positioned within the single level extendable housing 121 so that the hide-a-bed 122 and the set of dining furniture 124 are displaced away from the kitchen area 49 when the single level extendable housing 121 is placed into the deployed configuration. Furthermore, the kitchen area 49 includes a cabinet assembly 130 that comprises a kitchen counter 131, a stove 132, a food pantry 134, a refrigerator 136, a kitchen sink 135, and a step 140 that provides easy access to the elevated expanded middle space 70 of the trailer 30.

As shown in FIG. 2B, the expanded middle space 70 comprises a bathroom area 73 and a dressing room area 75. In particular, the bathroom area 73 includes a toilet closet 144, a shower 146, and a bathroom sink 147. Furthermore, the dressing room area 75 includes a movable cabinet such as a foldable wardrobe assembly 151 having a deployed configuration and a retracted configuration that will be described in greater detail below and a storage cabinet 154. Moreover, the foldable wardrobe assembly 151, the storage cabinet 154, and the bathroom sink 147 are attached to the two level extendable housing 32 within the lower space 41 of the housing 32 so that the assembly 151, cabinet 154 and sink 147 are displaced away from the toilet closet 144 and shower 146 when the housing 32 is placed into the deployed configuration (FIG. 2B). To accommodate movement of the sink 147 with respect to the frame 34, the sink 147 includes a known flexible hose assembly that communicates a faucet of the sink 147 with a fresh water reservoir and communicates a drain of the sink 147 with a waste water reservoir in a manner known in the art.

As shown in FIGS. 2A and 2B, the foldable wardrobe assembly 151 comprises a stationary cabinet 148 that is fixedly mounted to the two level extendable housing 32 within the lower space 41 of the housing 32, and a movable cabinet 150 which is pivotally mounted to the stationary cabinet by way of a hinge 149 so that the rotational axis of the hinge 149 is aligned in a vertical direction. As shown in FIG. 2B, the stationary cabinet 148 includes a front side 137 and an inboard side 138 and the movable cabinet 150 includes a front side 139, an outboard side 141, an inboard side 143, and a rear side 142, wherein the front and rear sides 139 and 142 are wider than the inboard and outboard sides 141 and 143. Furthermore, the hinge 149 couples with the inboard side 138 of the stationary cabinet 148 and further couples with the movable cabinet 150 along a corner 145 that connects the front side 139 with the outboard side 141 of the movable cabinet 150.

As shown in FIG. 2A, the foldable wardrobe assembly 151 is placed into the retracted configuration by rotating the movable cabinet 150 about the hinge 149 so that the wider front side 139 of the movable cabinet 150 is substantially aligned with the inboard side 138 of the stationary cabinet 148. As a result, the extendable housing 32 is able to be placed in the retracted configuration so that the rear side 142 of the movable cabinet 150 is flushly positioned adjacent the toilet closet 144.

As shown in FIG. 2B, when the extendable housing 32 is placed in the deployed configuration, a space is created with enables the foldable wardrobe assembly 151 to be placed into the deployed configuration. In particular, the movable cabinet 150 is rotated about the hinge 149 so that the outboard side 141 of the movable cabinet 150 substantially aligns with the inboard side 138 of the stationary cabinet 148. Thus the foldable wardrobe assembly 151 forms an elongated shape which is similar to that of known wardrobes. Moreover, the fully deployed extendable housing 32 provides sufficient room between the movable cabinet 150 and the toilet closet 144 so that a person can walk therebetween and so that a person can access the toilet closet 144.

As shown in FIG. 2B, the expanded front space 71 comprises a sleeping area 77 and a study area 79. In particular, the sleeping area 77 includes a queen sized bed 166 and an access space 165 adjacent the front vertical wall 42 of the main housing 40 that enables individuals to access the bed 166 in a convenient manner. Furthermore, the study area 79 includes a linen closet 158, a table 163, a chair 162, and a corner cabinet 164.

As shown in FIGS. 2A and 2B, the bed 166 is fixedly attached to the extendable housing 32 so that the bed 166 extends through the opening 39 of the main housing 40 when the extendable housing 32 is placed in the deployed configuration. Furthermore, the inboard end of the bed 166 is positioned under the linen closet 158 and table 163 when the extendable housing 32 is placed in the retracted configuration. Moreover, the bed 166 extends away from the linen closet 158, the table 163, and the corner cabinet 164 when the extendable housing 32 is placed in the deployed configuration so as to form a space therebetween that allows individuals to access the sleeping area 77 and study area 79.

It will be appreciated that the two level extendable housing 32 provides the trailer 30 with a more luxurious atmosphere. In particular, the expanded middle space 70 of the trailer 30 which results from the extendable housing 32 being placed in the deployed configuration provides ample room for individuals to conveniently utilize the bathroom and dressing areas 73 and 75. In contrast, travel trailers known in the art, including those having known extendable housings, typically comprise relatively small bathroom and dressing areas.

It will also be appreciated that the enlarged middle space 70 of the trailer 30 combined with the retractable nature of the foldable wardrobe assembly 151 enables the assembly 151 to be positioned outside from the sleeping area 77. Consequently, the sleeping area 77 is able to include the access space 165 so that individuals can conveniently access the bed 166. In contrast, travel trailers known in the art that utilize extendable housings typically position a wardrobe adjacent a front wall of the trailer adjacent to a sleeping area so that the space within the sleeping area is substantially reduced.

Figure 3D:
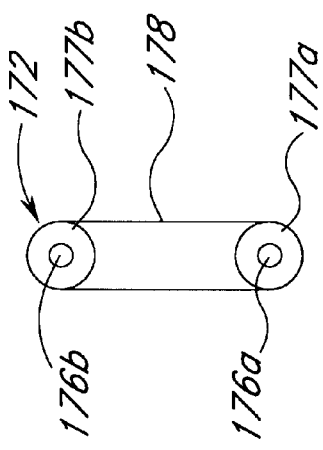
FIG. 3D is a side view of a torque transfer assembly of the two level actuator assembly of FIG. 3A that induces a lower horizontal shaft and an upper horizontal shaft of the two level actuator assembly to rotate in a synchronous manner
Figure 3C:
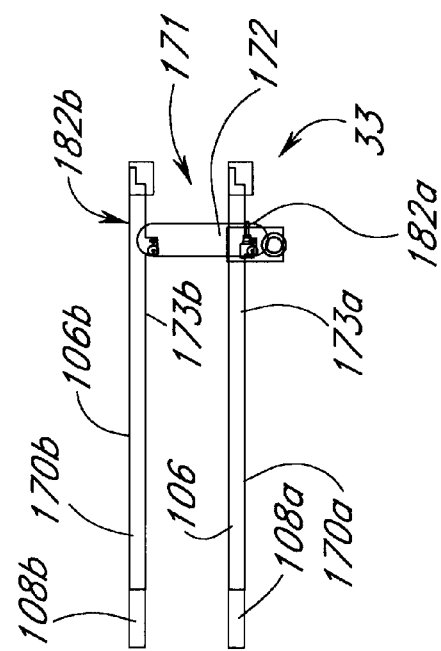
FIG. 3C is a front elevational view of the actuator assembly of FIG. 3A.

Reference will now be made to FIG. 3A–FIG. 3D which provide detailed illustrations of the actuator assembly 33 used to move the extendable housing 32. In particular, FIG. 3A is an overhead plan view of the actuator assembly 33, wherein the left side of FIG. 3A corresponds to the rear end of the actuator assembly 33 and the right side of FIG. 3A corresponds to the front end of the actuator assembly 33. Furthermore, FIG. 3B is a side elevational view of the actuator assembly 33, wherein the left side of FIG. 3B corresponds to the rear end of the actuator assembly 33 and the right side of FIG. 3B defines the front end of the actuator assembly 33. Moreover, FIG. 3C is a front elevational view of the actuator assembly 33. Additionally, FIG. 3D is a side elevational view of a torque transfer assembly 172 of the actuator assembly 33 from the perspective of an observer who is looking along the elongated axis of a rear horizontal shaft 176a.

As shown in FIGS. 3A–3C, the actuator assembly 33 is comprised of a rear rail assembly 170a, a front rail assembly 170b, and a drive assembly 171 interposed therebetween, wherein the front rail assembly 170b is elevated above the rear rail assembly 170a. As best shown in FIGS. 3A and 3C, the rear rail assembly 170 is comprised of a rear fixed support guide 108a and the rear horizontal slidable rail 106a that extends from the support guide 108a in a telescoping manner. Specifically, the rail 106a is adapted to slidably extend from an elongated channel formed within the support guide 108a so that the motion of the rail 106a is restricted to be along the elongated channel of the support guide 108a. Furthermore, a substantial portion of the slidable rail 106a will always remain within the support guide 108a so as to enable the rail 106a to function as a cantilever as will be described in greater detail below.

As shown in FIGS. 3A–3C, the front rail assembly 170b is substantially similar to the rear rail assembly 170a and is positioned so as to be elevated above the rear rail assembly 170a. As best shown in FIGS. 3A and 3C, the front rail assembly 170b is comprised of a front fixed support guide 108b and the front horizontal slidable rail 106b that extends from the support guide 108b in a telescoping manner. Specifically, the rail 106b is adapted to slidably extend from an elongated channel formed within the support guide 108b so that the motion of the rail 106b is restricted to be along the elongated channel of the support guide 108b. Furthermore, a substantial portion of the slidable rail 106b will always remain within the support guide 108b so as to enable the rail 106b to function as a cantilever as will be described in greater detail below.

As shown in FIGS. 3A and 3C, the front and rear rail assemblies 170a and 170b are preferably positioned so that the support guides 108a and 108b are aligned in a parallel manner and so that the outboard ends of the support guides 108a and 108b are both positioned in a common plane which is perpendicular to the elongated axis of both the support guides 108a and 108b. Furthermore, the rear slidable rail 106a is adapted with a plurality of uniformly spaced rack groves 173a along a lower surface of the rail 106a that enable the slidable rail 106a to form a portion of a rear rack and pinion assembly 182a. Similarly, the front slidable rail 106b is adapted with a plurality of uniformly spaced rack groves 173b along a lower surface of the rail 106b that are substantially similar to the groves 173a of the rear rail 106a that enable the slidable rail 106b to form a portion of a front rack and pinion assembly 182b that is substantially similar to the rear rack and pinion assembly 182a.

As schematically shown in FIGS. 3A and 3B, the drive assembly 171 of the actuator assembly 33 is comprised of a rear pinion 175a, a rear horizontal shaft 176a, the torque transfer assembly 172, a front horizontal shaft 176b, a front pinion 175b which is substantially similar to the rear pinion 175a, and an electric motor 183. In particular, the rear pinion 175a is fixedly attached at a rear end of the rear horizontal shaft 176a and the front pinion 175b is fixedly attached at a front end of the front horizontal shaft 176b. Furthermore, the rear and front horizontal shafts 176a and 176b are rotatably mounted so that the rotational axes of the front and rear shaft 176a are parallel to each other and both lie in a substantially common vertical plane. Moreover, the rear horizontal shaft 176a is positioned so that the rear pinion 175a engages with the plurality of rack grooves 173a of the rear slidable rail 106a so as to form the rear rack and pinion assembly 182a. Additionally, the front horizontal shaft 176b is positioned so that the front pinion 175b engages with the plurality of rack grooves 173b of the front slidable rail 106b so as to form the front rack and pinion assembly 182b.

As schematically shown in FIGS. 3A and 3B, torque transfer assembly 172 couples the rear shaft 176a with the front shaft 176b so that a torque applied by the rear shaft 176a will be transferred to the front shaft 176b. In particular, the front end of the rear shaft 176a attaches to a descending portion of the torque transfer assembly 172 and a rear end of the front shaft 176b attaches to an ascending portion of the torque transfer assembly 172.

As shown in FIG. 3D, the preferred embodiment of the torque transfer assembly 172 comprises a lower gear 177a, an upper gear 177b, and a flexible chain 178 having a closed end. In particular, the front end of the rear shaft 176a is fixedly attached to the lower gear 177a in a conventional manner and the rear end of the front shaft 176b is fixedly attached to the upper gear 177b in a conventional manner. Furthermore, the lower and upper gears 177a and 177b are aligned in a common vertical plane and the appropriately sized chain 178 is positioned to surround the lower and upper gears 177a and 177b so that the chain 178 engages with both the lower and upper gears 177a and 177b. Consequently, when a torque is applied by the rear shaft 176a onto the lower gear 177a, the tension of the chain 178 will increase in an asymmetrical manner so that a torque is transferred to the upper gear 177b and front shaft 176b. Moreover, the diameters of the lower and upper gears 177a and 177b are substantially equal so that the rear shaft 176a and the front shaft 176b always have the same angular velocity.

As shown in FIGS. 3A and 3B, the electric motor 183 of the drive assembly 171 of the actuator assembly 33 couples with the rear shaft 176a of the drive assembly 171 in a well known manner so as to enable the electric motor 183 to activate the drive assembly 171. In particular, when electric current is passed through the electric motor 183, the electric motor 183 generates a torque which causes the rear and front shafts 176a and 176b to rotate at a substantially equal angular velocity. Consequently, the rear and front rack and pinion assemblies 182a and 182b will operate in a substantially identical manner so that the rear and front slidable rails 106a and 106b will both travel with the same linear velocity.

It will be appreciated that the actuator assembly 33 provides an effective means for moving the extendable housing 32. In particular, the electric motor 183 couples with the rear shaft 176a, thereby providing the rear shaft 176a with a torque that induces the rear shaft 176a and the rear pinion 175a into a state of rotation. Thus, since the rear pinion 175a is positioned so as to engage the rack grooves 173a of the rear slidable rail 106a, the rotating rear pinion 175a will induce the slidable rail 106a to move in a lateral manner.

Furthermore, the rear shaft 176a will provide the torque transfer assembly 172 with a torque so as to rotate the front shaft 176b. In particular, since the rear shaft 176a is coupled with the lower gear 177a of the torque transfer assembly 172, the rear shaft 176a applies a torque onto the lower gear 177a, thereby causing the chain 178 of the torque transfer assembly 172 to experience an asymmetrical tension. Thus, the chain 178 applies a torque onto the upper gear 177b which transfers the torque to the front shaft 176*b*, thereby inducing the shaft 176*b* and, consequently, the front pinion 175*b* into a state of rotation. Moreover, since the front and rear rack and pinion assemblies 182*a* and 182*b* are substantially identical to each other and since the lower and upper gears 177*a* and 177*b* are substantially identical to each other, the rotating front pinion 175*b* will induce the front slidable rail 106*b* into a state of motion that is substantially identical to the state of motion of the rear slidable rail 106*a*.

Consequently, since the rear and front slidable rails 106*a* and 106*b* are coupled with the extendable housing 32 in a manner that will be described in greater detail below, the synchronous movement of the rear and front slidable rails 106*a* and 106*b* will move the extendable housing 32 in an aligned manner. In particular, the synchronous movement of the rear and front slidable rails 106*a* and 106*b* will induce movement of the extendable housing so that the outboard wall 54 of the extendable housing 32 will tend to align with a plane which is parallel to the plane of the left side wall 46 of the main housing 40. Therefore, it is unlikely that the extendable housing 32 will become immobilized with respect to the frame 34 of the trailer 30 due to improper alignment between the extendable housing 32 and the main housing 40.

Figure 4A:
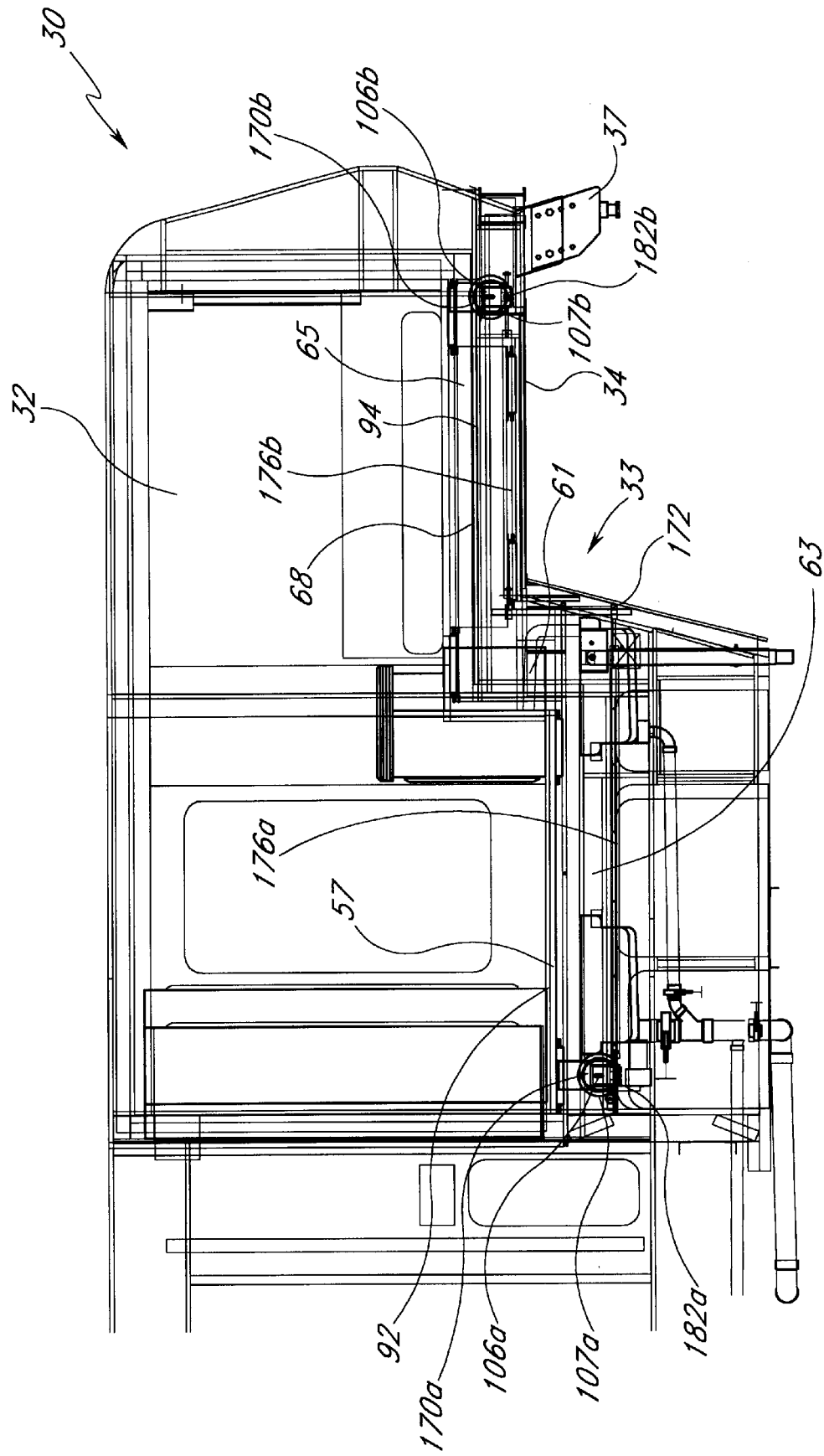
FIG. 4A is a side elevational view of the travel trailer of FIG. 1.
Figure 4B:
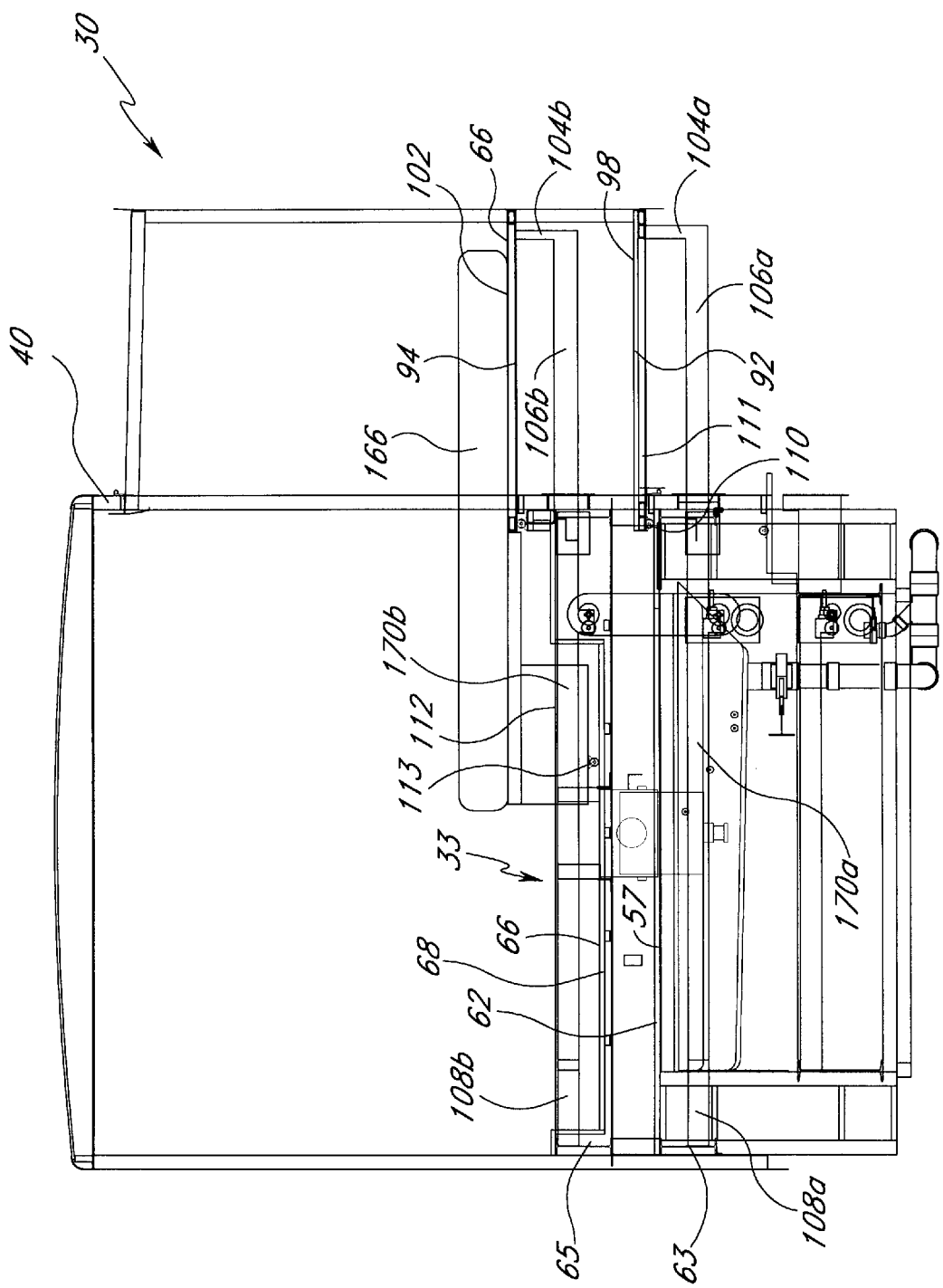
FIG. 4B is a front elevational view of the travel trailer of FIG. 1.

Reference will now be made to FIGS. 4A and 4B which illustrate the recreational travel trailer 30 in greater detail. In particular, FIG. 4A is a side elevational view of the trailer 30 of FIG. 1. Furthermore, FIG. 4B is a front elevational view of the trailer 30 of FIG. 1, wherein the extendable housing 32 is illustrated in the deployed configuration.

As shown in FIG. 4A, the actuator assembly 33 is mounted within the frame 34 of the trailer 30. In particular, the rear rail assembly 170*a*, the rear rack and pinion assembly 182*a*, and the rear horizontal shaft 176*a* of the actuator assembly 33 are positioned within the middle platform 63 of the frame 34 so that the rear horizontal shaft 176*a* is positioned in a substantially longitudinal manner and so that the rear rail assembly 170*a* is positioned in a lateral manner. Furthermore, the torque transfer assembly 172 of the actuator assembly 33 is positioned within the front vertical riser 61 of the frame 34. Moreover, the front horizontal shaft 176*b*, the front rack and pinion assembly 182*b*, and the front rail assembly 170*b* of the actuator assembly 33 are positioned within the front platform 65 of the frame 34 so that the front horizontal shaft 176*b* is positioned in a substantially longitudinal manner and so that the front rail assembly 170*b* is positioned in a lateral manner.

As shown in FIG. 4A, the rear and front horizontal slidable rails 106*a* and 106*b* of the actuator assembly 33, which are used to move the extendable housing 32 between the retracted and deployed configurations, are adapted to extend from the frame 34 of the trailer 30. In particular, the frame 34 includes a rear opening 107*a* at an outboard edge of the middle platform 63 adjacent the rear end of the middle platform 63 that enables the rear slidable rail 106*a* of the rear rail assembly 170*a* to extend from the frame 34 in a lateral manner. Similarly, the frame 34 includes a front opening 107*b* at an outboard edge of the front platform 65 adjacent the front end of the front platform 65 that enables the front slidable rail 106*b* of the front rail assembly 170*b* to extend from the frame 34 in a lateral manner.

As shown in FIGS. 4A and 4B, the actuator assembly 33 is positioned underneath the extendable housing 32 and the middle and front lower horizontal walls 57 and 68 of the trailer 30. In particular, the rear rail assembly 170*a* is positioned beneath the rear lower wall 92 of the extendable housing 32 and the front rail assembly 170*b* is positioned beneath the front lower wall 94 of the extendable housing 32. As will be described in greater detail below, the slidable rails 106*a* and 106*b* respectively couple with the rear lower wall 92 and the front lower wall 94 so as to enable the actuator assembly 33 to move the extendable housing 32 between the retracted and deployed configurations.

As shown in FIG. 4B, the lower floor 98 of the extendable housing 32 is vertically aligned with the middle floor 62 of the main housing 40 in a substantial manner and is adapted to travel across the middle floor 62 during movement of the extendable housing in a non-sliding manner. In the preferred embodiment, a known roller assembly 110 having a low profile is mounted to a lower surface 111 of the lower horizontal wall 92 of the extendable housing 32 adjacent the inboard edge of the lower horizontal wall 92 so as to be interposed between the lower surface 111 of the lower horizontal wall 92 and the middle floor 62 of the main housing 40 in a flush manner. Thus, when the extendable housing 32 is moved in a lateral manner, the roller assembly 110 will roll across the middle floor 62 so that the extendable housing 32 can be moved with a relatively small lateral force.

As shown in FIG. 4B, the preferred embodiment of the trailer 30 comprises the upper floor 102 of the extendable housing 32 that is substantially elevated above the front floor 66 of the main housing 40. In particular, this enables the outboard end of the bed 166 to be positioned directly on the upper floor 102 so that the inboard end of the bed 166 is sufficiently elevated above the front floor 66 of the main housing 40 so as to enable individuals to conveniently access the bed 166. However, it will be appreciated that, in another embodiment, the upper floor 102 of the extendable housing 32 could be adapted to align with the upper floor 66 of the main housing 40.

As shown in FIG. 4B, the inboard end of the bed 166 is supported by an inboard bed support 112 having a known roller assembly 113. In particular, the inboard bed support 112 is positioned beneath the inboard end of the bed so as to support the bed 166 as well as individuals who are sleeping on the bed 166. Furthermore, the roller assembly 113 is attached to a lower surface of the inboard bed support 112 so that the roller assembly 113 is flushly interposed between the inboard bed support 112 and the front floor 66 of the main housing 40. Thus, when the bed 166 is moved along with the extendable housing 32, the roller assembly 113 of the inboard bed support 112 will roll along the front floor 66 of the main housing 40 so as to reduce the lateral force that is required to move the extendable housing 32.

As shown in FIG. 4B, the rear and front rail assemblies 170*a* and 170*b* of the actuator assembly 33 are laterally mounted to the frame 34 of the trailer 30. In particular, the rear support guide 108*a* of the rear rail assembly 170*a* is laterally mounted within the middle platform 63 so that the slidable rail 106*a* can extend from the trailer 30 in a lateral manner and be supported by the rear support guide 108*a*. Furthermore, the front support guide 108*b* of the front rail assembly 170*b* is laterally mounted within the front platform 65 so that the slidable rail 106*b* can extend from the trailer 30 in a lateral manner and be supported by the front support guide 108*b*.

As shown in FIG. 4B, the slidable rails 106*a* and 106*b* engage with the extendable housing 32 so that they can maneuver and support the extendable housing 32. In particular, the rear and front slidable rails 106*a* and 106*b* laterally extends from the frame 34 of the trailer 30 so that the outboard ends of the rails 106a and 106b are substantially adjacent the outboard vertical wall 84 of the extendable housing 32. Furthermore, the upwardly extending bracket 104a connects the outboard end of the rear rail 106a with the rear lower horizontal wall 92 of the extendable housing 32 so that the rear rail assembly 170a can move the extending housing 32 and so that the rear slidable rail 106a of the rear rail assembly 170a can cantilever the extendable housing 32 in the deployed configuration. Moreover, the upwardly extending bracket 104b attaches the outboard end of the front rail 106b with the front lower horizontal wall 94 of the extendable housing 32 so that the front rail assembly 170b can move the extending housing 32 and so that the front slidable rail 106b of the front rail assembly 170b can cantilever the extendable housing 32 in the deployed configuration.

It will be appreciated that the two level extendable housing 32 of the trailer 30 extends across two floor levels of the trailer 30. Thus, the supplemental living space 35 formed within the extendable housing 32 is substantially greater than the supplemental living space of similarly positioned extendable housings of travel trailers known in the art. Consequently, the extendable housing 32 is able to encompass the bathroom area 73 as well as the sleeping area 77, so as to provide both of these areas with greater space.

It will also be appreciated that the actuator assembly 33 enables the extendable housing 32 to be maneuvered between the deployed and retracted configurations in a desirable manner. In particular, the vertically offset slidable rails 106a and 106b are adapted to respectively move the rear and front ends of the extendable housing 32 in a synchronous manner so as to maintain the extendable housing 32 in an aligned state with respect to the main housing 40.

It will also be appreciated that the actuator assembly can be manufactured at a relatively low cost. In particular, the components of the actuator assembly 33 can be readily fabricated and installed within the frame 34 of the trailer 32 using relatively simple installation techniques known in the art.

Figure 5:
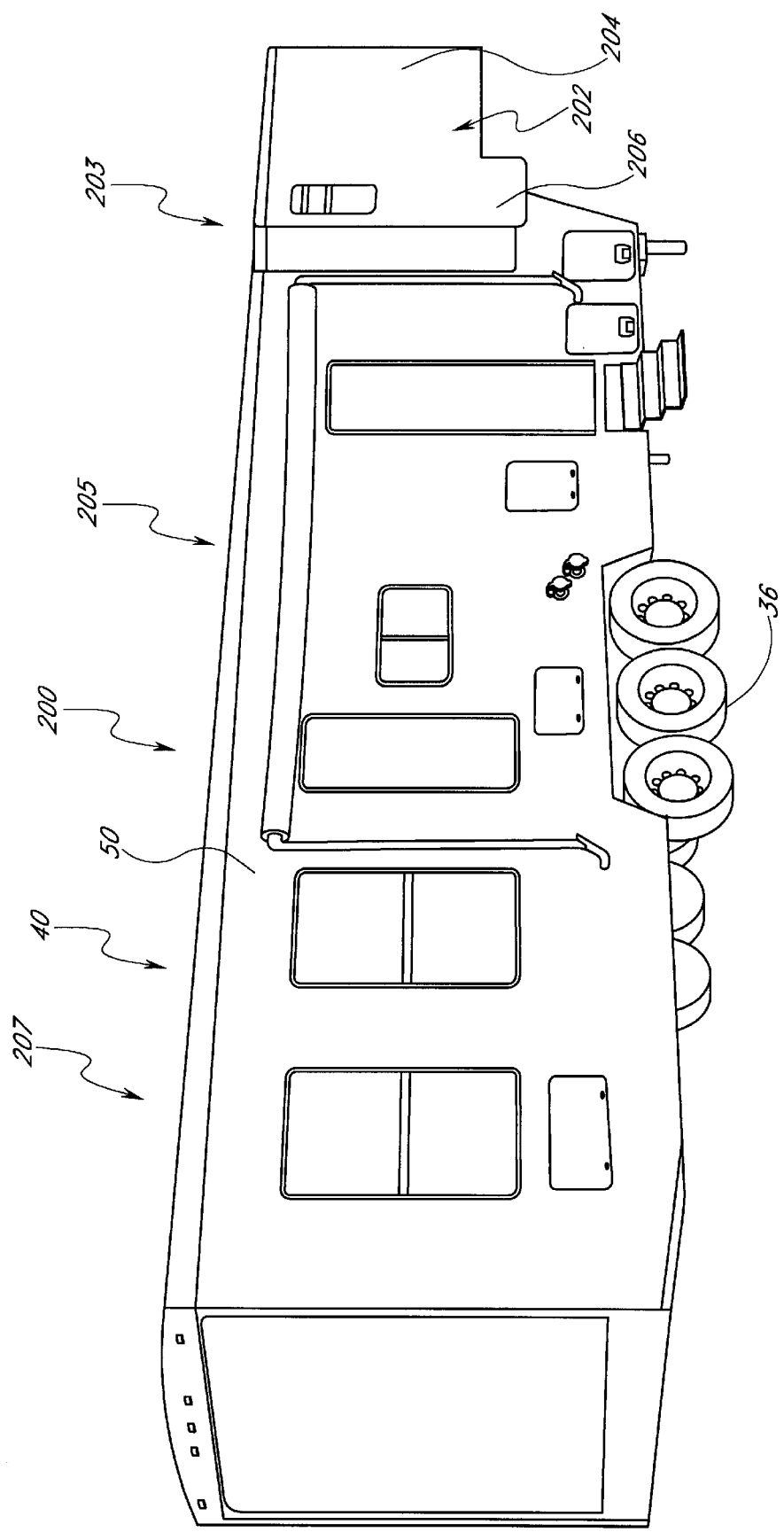
FIG. 5 is a perspective view of a travel trailer in accordance with another aspect of the present invention which illustrates a slide-out assembly of the trailer in a deployed position.
Figure 6:
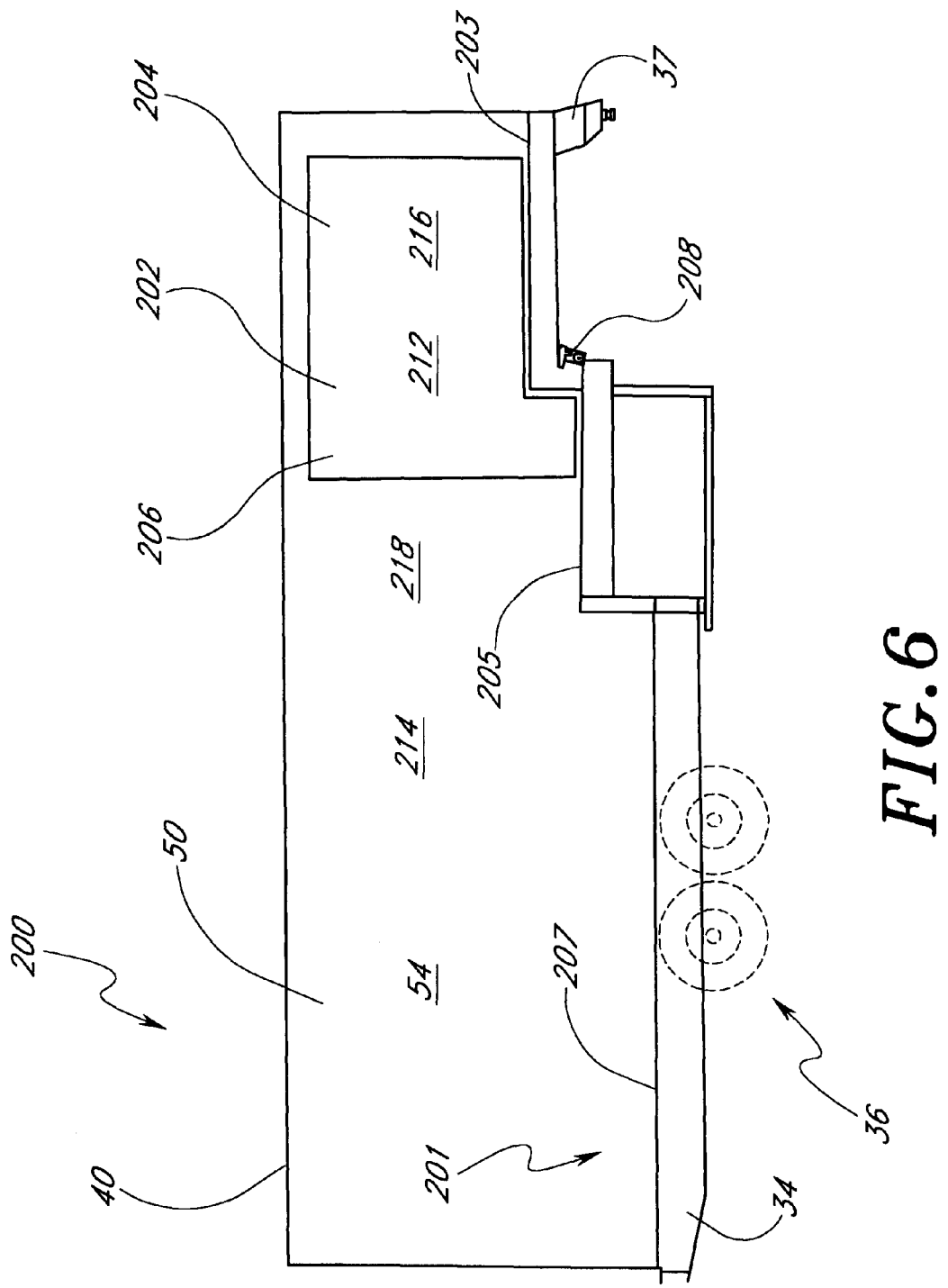
FIG. 6 is a schematic diagram of the trailer of FIG. 5.

Reference will now be made to FIGS. 5–11 which illustrate a travel trailer 200 in accordance with another aspect of the invention. As schematically shown in FIG. 6, the trailer 200 is similar to the trailer 30 described above and comprises the multi-level chassis 34, the wheel assembly 36, the hitch 37, and the main housing 40. The trailer further comprises a multi-level floor 201 having a front section 203, a middle section 205, and a rear section 207 disposed above the chassis 34. The main housing 40 and the multilevel floor 201 define an interior living space 214 within the trailer 200 that comprises a first room 216 disposed above the front floor section 203 and a second room 218 disposed above the middle floor section 205 such that the first room 216 is elevated above the second room 218. In the preferred embodiment, the first room 216 is a bedroom and the second room 218 is a bathroom (see FIGS. 7–9).

As shown in FIGS. 5 and 6, the trailer 200 further comprises a slide-out assembly 202 that extends from the first and second rooms 216 and 218 along the curb-side wall 50 of the main housing 40 so as to enlarge the volume of the trailer 200 when in a deployed position and so as to reduce the volume of the trailer 200 when in a retracted position. The slide-out assembly 202 comprises first and second sections 204 and 206 such that the first section 204 is disposed adjacent to the bedroom 216 and the second section 206 is disposed adjacent to the bathroom 218. As will be described in greater detail below, the slide-out assembly 202 is moved between the deployed and retracted positions by an actuator assembly 208 disposed beneath the slide-out assembly 202.

In the preferred embodiment, the slide-out assembly 202 is a two-level extendable housing that is akin to the two level extendable housing 32 of the trailer 30 described above such that the extendable housing 202 extends from a single opening 212 in the main housing 40. However, it will be appreciated that, in another embodiment, the slide-out assembly 202 could comprise separate first and second sections that extend through separate openings in the main housing such that the sections are moved by the actuator assembly 208 in a simultaneous manner.

Figure 7:
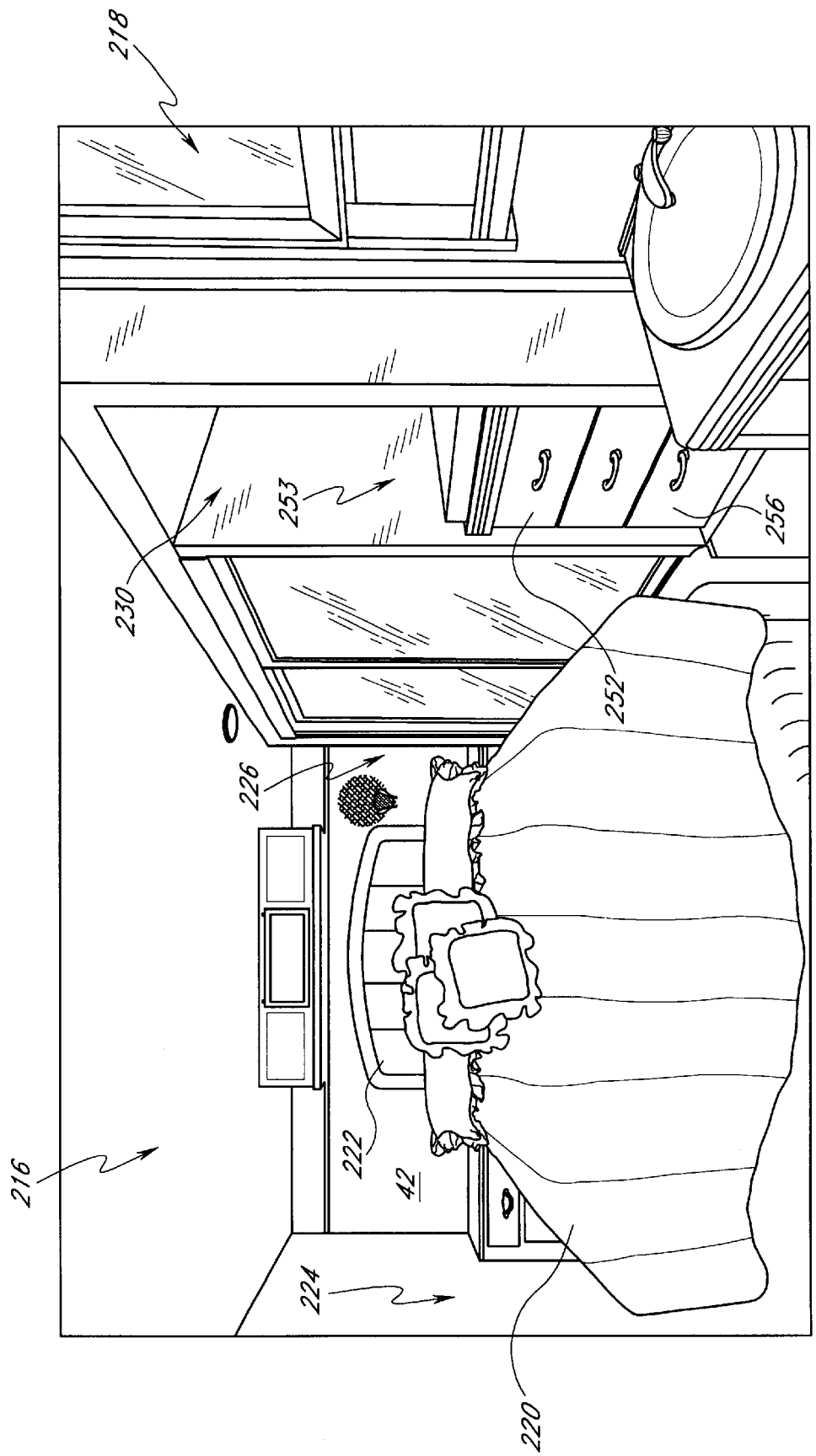
FIG. 7 is a perspective view of a bedroom and bathroom of the trailer of FIG. 5 showing the slide-out assembly in a retracted position.
Figure 8:
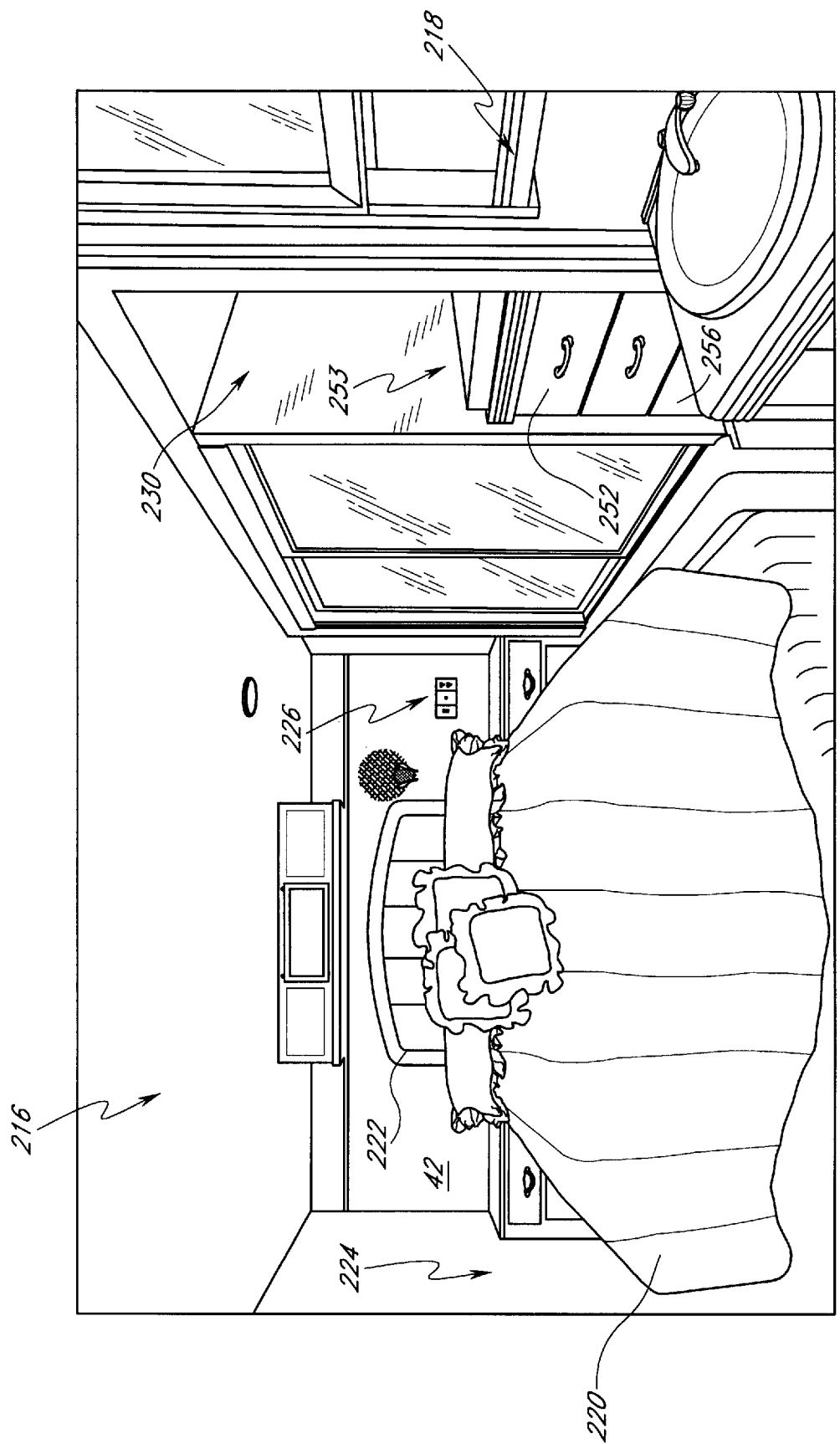
FIG. 8 is a perspective view of the bedroom and bathroom of the trailer of FIG. 5 showing the slide-out assembly in the deployed position.
Figure 9:
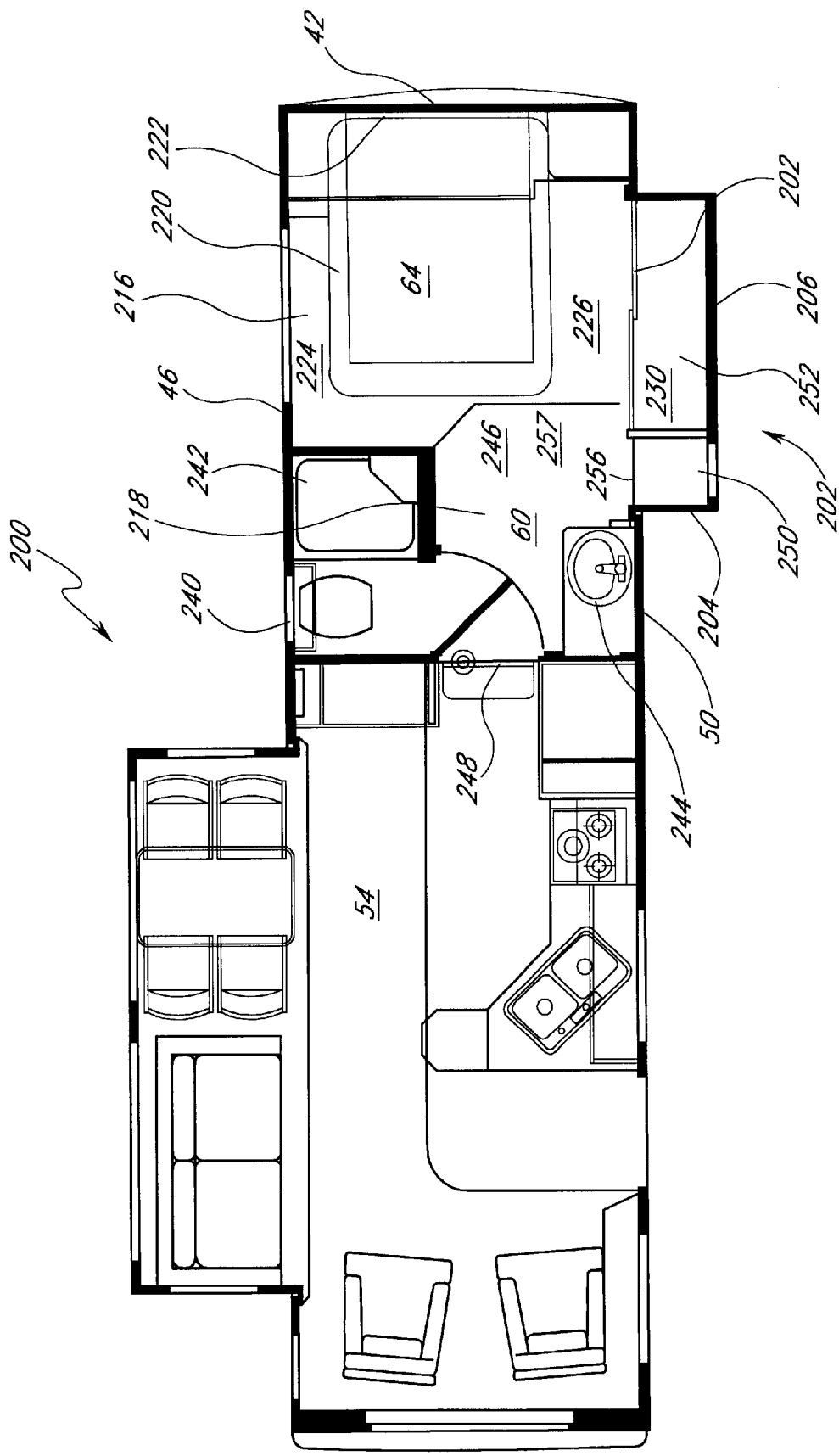
FIG. 9 is an overhead sectional view of the trailer of FIG. 5 illustrating the layout of the trailer when the slide-out assembly is in the deployed position.

FIGS. 7–9 illustrate the bedroom 216 and bathroom 218 of the trailer 200 in greater detail. In particular, FIG. 7 illustrates the bedroom 216 and a portion of the bathroom 218 when the slide-out assembly 202 is in the retracted position and FIGS. 8 and 9 illustrate the bedroom 216 and bathroom 218 when the slide-out assembly 202 is in the deployed position. As best shown in FIG. 9, the bedroom 216 includes a bed 220 positioned in a longitudinal manner such that a head 222 of the bed 220 is adjacent the front wall 42 of the main housing 40 of the trailer 200. Furthermore, the bed 220 is not coupled to the slide-out assembly 202 so that its position is not affected by retraction and deployment of the slide-out assembly 202. Consequently, because the bed 220 and objects positioned on top of the bed 220 are not displaced when the slide-out assembly 202 is retracted and deployed, the force required to retract and deploy the slide-out assembly 202 is reduced.

As shown in FIG. 9, the first section 204 of the slide-out assembly 202 comprises a first storage compartment 250 disposed adjacent the bedroom 216. In one embodiment, the storage compartment 250 comprises a wardrobe closet 252 for storing clothes. The slide-out assembly 202 further comprises a second storage compartment 250 disposed adjacent the bathroom 218. In one embodiment, the storage compartment 250 is housed within the second section 206 of the dual level slide-out assembly 202. However, it will be appreciated that, in another embodiment, the slide-out assembly 202 could be a single level extendable housing that extends from the bedroom and the storage compartment 250 could be attached to the single level extendable housing such that movement of the single level extendable housing between the retracted and deployed positions results in corresponding movement of the compartment 250. Preferably, the compartment 250 is accessible from the bathroom 218. However, in another embodiment, the compartment 250 could be accessible from outside of the trailer 200.

As shown in FIG. 9, the bed 220 is positioned within the bedroom 216 such that a driver-side access lane 224 is defined between the bed 220 and the driver-side wall 46 of the main housing 40 and such that a curb-side access lane 226 is defined between the bed 220 and the slide-out assembly 202. The access lanes 224 and 226 are sized so that an individual can easily walk therethrough to access the bed 220 from either side of the bed. Moreover, the curb-side lane 226 provides easy access to the wardrobe closet 252. The bed 220 is preferably a queen bed which provides a comfortable sleeping surface for two or more individuals. Furthermore, when retracted, the first section 204 of the slide-out assembly 202 is received into the curb-side access lane such that the wardrobe closet 252 is positioned adjacent the bed 220 in a substantially flush manner as shown in FIG. 7.

As shown in FIG. 9, in one embodiment, the bathroom 218 comprises a toilet closet 240 and a shower stall 242 disposed adjacent the driver-side wall 86 of the main housing 40. The bathroom 218 further comprises a sink 244 disposed adjacent the curb-side wall 50 such that the position of the sink 244 is fixed with respect to the chassis.

Furthermore, the bathroom 218 defines an access space 246 for enabling individuals to access the toilet closet 240, the shower stall 242 and the sink 244 and for enabling individuals to walk between the bedroom 216 and the rear space 54 of the trailer 200.

In one embodiment, the compartment 250 of the second section 206 of the slide-out assembly 202 comprises a fixture 254, such as a chest of drawers, a shelf, or a cabinet, for storing items such as clothes, toiletries, and the like. When the slide-out assembly 202 is retracted, a front vertical face 256 of the compartment 250 is inwardly displaced with respect to the curb-side wall 50 of the main housing 40 as shown in FIG. 7. Furthermore, when deployed, the front vertical face 256 is substantially aligned with the wall 50 as shown in FIGS. 8 and 9. As a result, the access space 246 of the bathroom is substantially increased such that a generously sized opening 257 between the access space 246 of the bathroom 218 and the curb-side access lane 226 of the bedroom 216 is created. Thus, since an individual is able to easily access the wardrobe closet 252 from the bathroom 218 by walking from the access space 246 of the bathroom 218 to the curb-side access lane 226 of the bedroom 216 through the opening 257, the bathroom 218 can be used as a dressing area Since the height of the ceiling of the bathroom 218 is greater than the height of the ceiling of the bedroom 216 and since the width of the access space 246 of the bathroom 218 is greater than the width of the access lane 226 of the bedroom 216, a greater amount of dressing space is provided.

As shown in FIGS. 7 and 8, in one embodiment, a television storage space 253 is defined within the second section 206 of the slide-out assembly 202 above the chest of drawers 254 so as to enable a television to be positioned therein. The chest of drawers 254 comprises an upper slidable platform 255 for supporting the television thereon such that the television can be retracted into the slide-out assembly 202 for storage and extracted from the slide-out assembly 202 for viewing.

Figure 10:
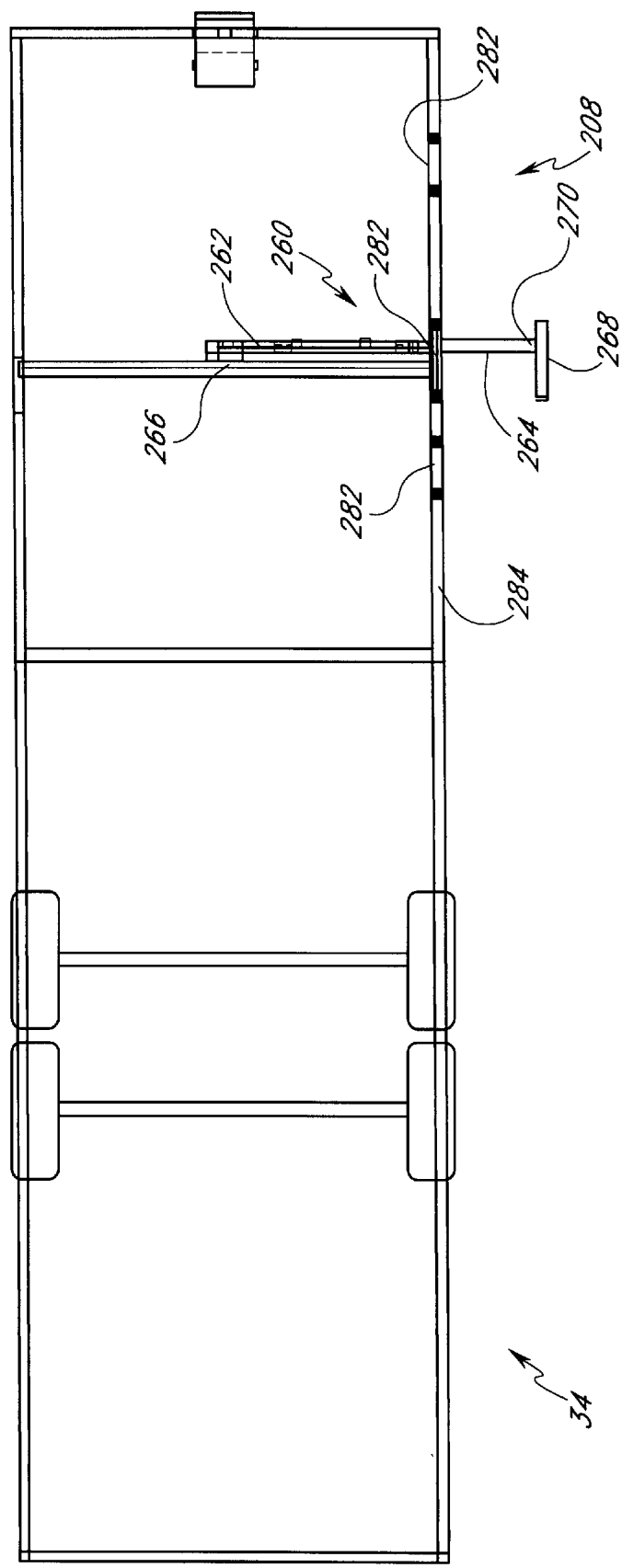
FIG. 10 is an overhead sectional view of the trailer of FIG. 5 illustrating an actuator assembly used to move the slide-out assembly between the retracted and deployed positions.
Figure 11:
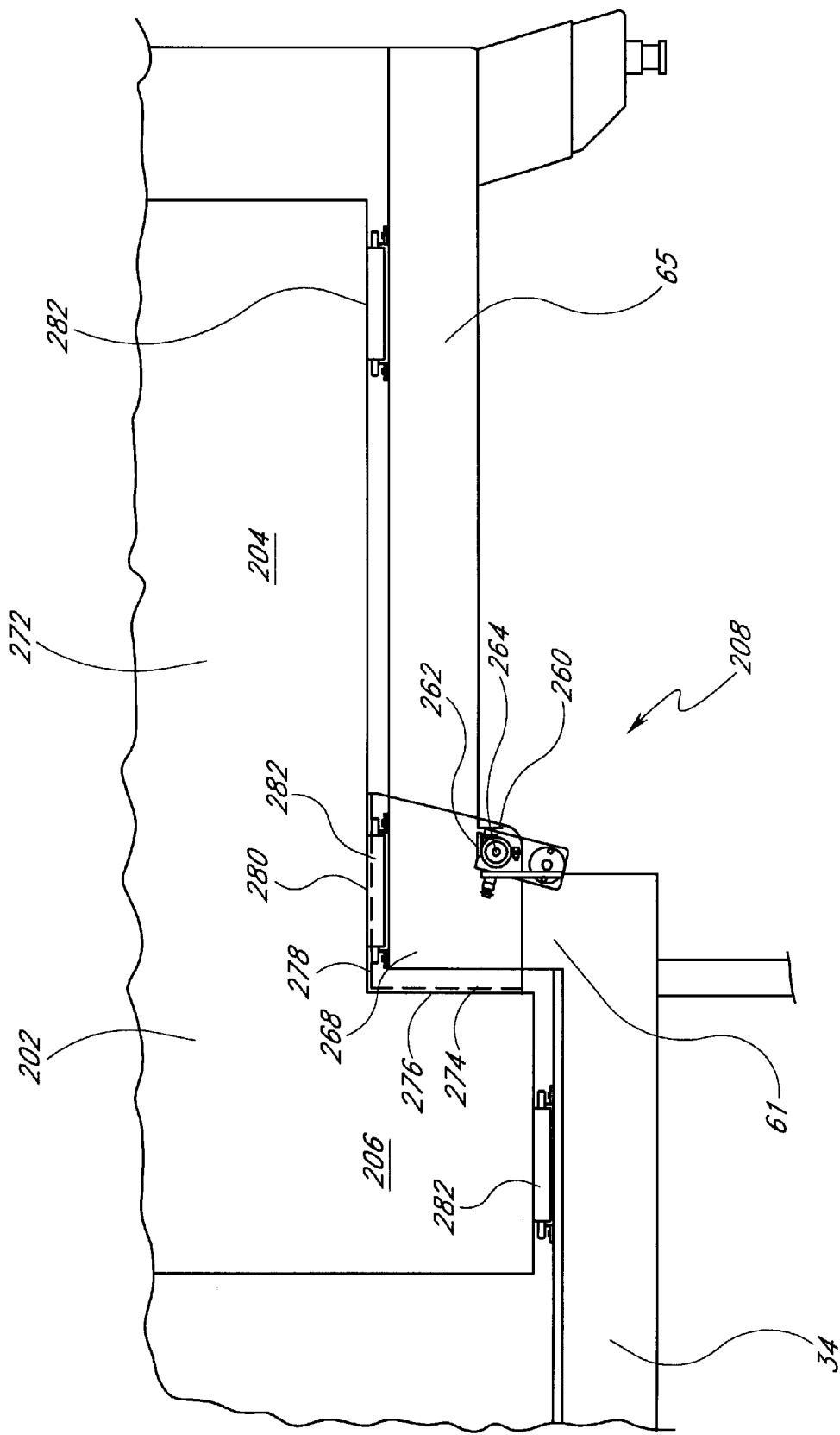
FIG. 11 is a side view of the actuator assembly of FIG. 10.

FIGS. 10 and 11 illustrate the actuator assembly 208 of the trailer 200 which is used to deploy and retract the slide-out assembly 202 of FIGS. 5–9. The actuator assembly 208 comprises a single linear actuator 260 of a known type having a base 262 and an elongate rod 264 that extends from the base 262 in a telescoping manner along an elongate axis of the rod 264. For example, in one embodiment, the rod 264 includes a threaded outer cylindrical surface and the base 262 includes a threaded cylindrical opening sized to allow the rod 264 to extend therethough such that rotation of the rod 264 about its elongate axis within the base 262 causes the rod 264 to undergo translational motion along its elongate axis. The actuator assembly 208 further comprises a known drive mechanism 266 for rotating the rod 264. For example, in one embodiment, the drive mechanism 266 comprises an electric motor and a gear box for coupling the motor to the rod 264. In one other embodiment actuators, such as the actuators available from RBW of Chino, Calif., can be used.

As shown in FIGS. 10 and 11, the base 262 of the linear actuator 262 is disposed adjacent the front vertical riser 61 and the front horizontal platform 65 of the chassis 34. The base 262 is attached to the chassis 34 in a well known manner so that the rod 264 of linear actuator 262 is disposed beneath the slide-out assembly 202. The base 262 is laterally disposed so that the rod 264 is able to outwardly extend from the chassis 34 in a lateral manner. The drive mechanism 266 is disposed adjacent the linear actuator 260 so that the drive mechanism 266 engages with the linear actuator 260 in a well known manner.

As shown in FIGS. 10 and 11, the slide-out assembly 202 further comprises a mounting bracket 268 for strengthening the slide-out assembly 202 and for coupling the rod 264 of the linear actuator 260 to the slide-out assembly 202. The bracket 268 comprises a plate of rigid material, such as a plate of ⅜ inch steel, having an attachment region 269 which attaches to an outer end 270 of the rod 264 in a well known manner such that the bracket 268 is positioned adjacent the slide-out assembly 202 in a longitudinal manner. More particularly, the bracket 268 is positioned adjacent to both the first and second sections 204 and 206 of the slide-out assembly 202. Preferably, a vertical mounting surface 274 of the bracket 268, such as that which is provided by a first bent section 271 of the bracket 268, is securely attached to a vertical surface 276 of the second section 204 of the slide-out assembly 202. Furthermore, a horizontal mounting surface 278 of a second bend section 273 of the bracket 268 is securely attached to a horizontal surface 280 of the front section 206 of the slide-out assembly 202. Thus, because the bent sections 271 and 273 of the bracket 268 are respectively mounted to the first and second sections 204 and 206 of the slide-out assembly 202 in a secure manner, the bracket 268 significantly rigidifies the slide-out assembly 202 and, thus, prevents the slide-out assembly 202 from contorting while it is moved between the retracted and deployed positions by the actuator assembly 208.

As shown in FIGS. 10 and 11, the actuator assembly 208 further comprises a plurality of rollers 282 for facilitating movement of the slide-out assembly 202 between the retracted and deployed positions. The rollers 282 are disposed adjacent a curb-side edge 284 of the chassis 34 so as to be interposed between the chassis 34 and the slide-out assembly 202 such that the slide-out assembly 202 is partially supported by the rollers 282. The rollers 282 are rotatably attached to the chassis 34 so as to provide the rollers 282 with rotational axes that are longitudinally aligned. Consequently, the rollers 282 reduce the magnitude of sliding frictional forces acting on the slide-out assembly which reduces the force required to move the slide-out assembly with respect to the main housing.

Thus, a lateral force provided by the linear actuator 260 of the actuator assembly 208 urges the slide-out assembly 202 to move in a corresponding manner. Since the first and second sections 204 and 206 of the slide-out assembly 202 are secured by the bracket 268 and since the linear actuator 260 applies a reduced force onto the slide-out assembly 202 through the bracket 268, the first and second sections 204 and 206 of the slide-out assembly 202 simultaneously move with equal linear velocities. Hence, even though the slide-out assembly 202 is only acted upon by the single linear actuator 260, it is unlikely that the slide-out assembly 202 will not be moveable between the retracted and deployed positions. More particularly, the reduced amount of force required to move the slide-out assembly 202 combined with the rigidifying bracket 268 reduce the likelihood of a misalignment between the slide-out assembly 202 and the main housing 40.

It will be appreciated that the slide-out assembly 202 provides the trailer 200 with the enlarged bedroom 216 and bathroom 218. As a result, the bedroom 216 and bathroom 218 can be appointed in a more luxurious manner so as to provide individuals with a more comfortable living environment. In particular, the slide-out assembly 202 provides the storage compartments 230, 250 for storing items such as clothes and a television without diminishing the size of the bedroom 216 or bathroom 218. Thus, space above the chassis 34 that is typically occupied by large storage regions such as a wardrobe closet, a chest of drawers, or a television cabinet is available for other purposes, such as providing the bedroom with the access lanes 226 and the bathroom with the enlarged access space 246. Furthermore, since the actuator assembly 208 used to move the slide-out assembly 202 between the retracted and deployed positions comprises the relatively simple single linear actuator 260, the trailer 200 can be manufactured at a reduced cost.

Although the preferred embodiment of the present invention has shown, described and pointed out the fundamental novel features of the invention as applied to this embodiment, it will be understood that various omissions, substitutions and changes in the form of the detail of the device illustrated may be made by those skilled in the art without departing from the spirit of the present invention. Consequently, the scope of the invention should not be limited to the foregoing description, but should be defined by the appending claims.

What is claimed is:

1. A travel trailer comprising:
    a chassis;
    a set of rotatable wheels attached to the chassis so as to allow the trailer to travel on a roadway;
    a floor disposed above the chassis, wherein the floor defines an inner living space of the trailer and wherein the floor has a first vertical level positioned at a first height above the roadway and a second vertical level positioned at a second height above the roadway;
    a main housing that comprises a plurality of walls disposed above the chassis so as to enclose the inner living space of the trailer;
    an extendable housing disposed adjacent a first wall of the plurality of walls of the main housing, the extendable housing including a floor having a first and second level and a plurality of walls extending from the floor so as to define a supplementary space therein, wherein the first and second level of the floor of the extendable housing are respectively positioned adjacent the first and second vertical levels of the floor of the trailer disposed above the chassis, wherein the extendable housing is movable between (a) a first position such that an outer wall of the plurality of walls of the extendable housing is disposed adjacent a plane of the first wall and (b) a second position wherein the outer wall of the extendable housing is disposed outward from the plane of the first wall; and
    a movement mechanism coupled to the extendable housing, said movement mechanism moving the extendable housing between the first and second positions, wherein the movement mechanism comprises a single linear actuator.

2. The travel trailer of claim 1, wherein the single linear actuator comprises a base and a rod that extends from the base in a telescoping manner.

3. The travel trailer of claim 2, wherein the movement mechanism further comprises a drive apparatus for urging the rod to extend from the base.

4. The travel trailer of claim 3, wherein the movement mechanism further comprises a plurality of rotatably mounted rollers interposed between the chassis and the extendable housing, said rollers reducing frictional forces acting on the extendable housing.

5. The travel trailer of claim 3, wherein the extendable housing comprises a rigid plate for rigidifying the extendable housing, said rigid plate attached to a first end of the rod of the linear actuator.

6. The travel trailer of claim 1, wherein the travel trailer includes a main level, a first elevated level corresponding to the first vertical level and a second elevated level corresponding to the second vertical level.

7. The trailer of claim 6, wherein the extendable housing comprises (a) a rear section disposed adjacent the first elevated level and (b) a front section disposed adjacent the second elevated level.

8. The travel trailer of claim 7, wherein the trailer further comprises a bedroom disposed over the second elevated level, said front section of the extendable housing providing a storage area for the bedroom.

9. The travel trailer of claim 8, wherein the bedroom comprises a bed longitudinally disposed therein so as to define a driver-side access lane and a curb-side access lane between the bed and the main housing.

10. The travel trailer of claim 9, wherein the trailer further comprises a bathroom disposed over the first elevated level, said rear section of the extendable housing providing a storage area for the bathroom.

11. The travel trailer of claim 1, wherein the first wall is a curb-side wall.

12. A travel trailer comprising:
    a chassis;
    a set of rotatable wheels attached to the chassis so as to allow the trailer to travel on a roadway;
    a main housing disposed above the chassis so as to define an inner living space of the trailer;
    a multilevel floor disposed above the chassis, said multilevel floor comprising first and second floor levels disposed at respective first and second heights above the roadway, said inner living space comprising first and second rooms respectively disposed above the first and second floor levels;
    a slide-out assembly having a first and second section, wherein the slide-out assembly is movable between (a) a retracted position such that the first and second sections of the slide-out assembly overlap first and second access spaces of the first and second rooms of the inner living space and (b) a deployed position wherein the first and second sections of the slide-out assembly are respectively displaced from the first and second access spaces of the first and second rooms of the inner living space of the travel trailer; and
    an actuator assembly for moving the slide-out assembly between the retracted and deployed positions, wherein the actuator assembly comprises a single linear actuator.

13. The trailer of claim 12, wherein the single linear actuator comprises a base and an elongate rod, wherein the base is fixedly mounted to the chassis and the rod movably extends from the base so as to apply a single laterally directed force onto the slide-out assembly that urges the slide-out assembly to move between the retracted and deployed positions.

14. The trailer of claim 13, wherein the slide-out assembly comprises a rigid plate coupled to the rod of the actuator assembly, said rigid plate rigidifying the slide-out assembly so that the slide-out assembly is less likely to contort when moved between the retracted and deployed positions.

15. The trailer of claim 12, wherein the second section of the slide-out assembly comprises a storage compartment.

16. The trailer of claim 15, wherein the first room is a bedroom disposed at a front end of the trailer and wherein the second room is a bathroom disposed behind the bedroom.

17. The trailer of claim 16, wherein the storage compartment is a chest of drawers for storing clothes, wherein the chest of drawers is disposed adjacent the second access space when the slide-out assembly is in the deployed position.

18. The trailer of claim 17, wherein the multilevel floor further comprises a third floor level disposed at a third height above the roadway, said interior living space further comprising a third room disposed above the third floor level, wherein the third room is disposed behind the second room.

19. The trailer of claim 17, wherein the first section of the slide-out assembly comprises a wardrobe closet for storing clothes, wherein the wardrobe closet is disposed adjacent the first access space when the slide-out assembly is in the deployed position.

20. A fifth wheel trailer comprising:
   a set of wheels;
   a chassis attached to the set of rotatable wheels so as to permit movement of the chassis over the ground;
   a main housing, wherein the chassis and the main housing define a three level enclosed living space with a first level located at a first height above the ground, a second level located at a second height, greater than the first height above the ground and a third level located at a third height, greater than the second height above the ground wherein the second level defines a second area of available floor space and wherein the third level defines a third area of available floor space;
   an extendable housing attached to the main housing adjacent the second and third levels of the main housing and defining a second and third extendable floor spaces wherein the extendable housing is movable between a retracted position and an extended position;
   a fixture positioned on the second extendable floor space of the extendable housing wherein the extendable housing is attached to the main housing such that the fixture occupies the second area of available floor space when the extendable housing is in the retracted position and wherein the fixture is displaced from the second area of available floor space when the extendable housing is in the extended position.

21. A travel trailer comprising:
   a chassis;
   a set of rotatable wheels attached to the chassis so as to allow the trailer to travel on a roadway;
   a main housing disposed above the chassis so as to define an inner living space of the trailer;
   a multilevel floor disposed above the chassis, said multilevel floor comprising first and second floor levels disposed at respective first and second heights above the roadway, said inner living space comprising first and second rooms respectively disposed above the first and second floor levels;
   a slide-out assembly comprising an extendable housing and a storage compartment, wherein the slide-out assembly is moveable between (a) a retracted position such that the extendable housing overlaps an access space of the first room and the storage compartment overlaps an access space of the second room, and (b) a deployed position such that the extendable housing is displaced from the access space of the first room and the storage compartment is displaced from the access space of the second room; and
   an actuator assembly for moving the slide-out assembly between the retracted and deployed positions, said actuator assembly comprising a single linear actuator that applies a force at a first region on the slide-out assembly when moving the slide-out assembly so that the single linear actuator simultaneously moves the extendable housing and the storage compartment, wherein the single linear actuator comprises a base which is fixedly mounted to the chassis and an elongate rod which movably extends from the base, and wherein the slide-out assembly comprises a rigid plate coupled to the rod of the actuator assembly, said rigid plate rigidifying the slide-out assembly so that the slide-out assembly is less likely to contort when moved between the retracted and deployed positions.

22. A travel trailer comprising:
   a chassis comprising first, second, and third horizontal sections vertically offset from each other;
   a set of rotatable wheels attached to the chassis so as to allow the trailer to travel on a roadway;
   a main housing disposed above the chassis so as to define an inner living space therein, wherein the inner living space comprises a bedroom having occupied and unoccupied portions disposed above the first horizontal section of the chassis, a bathroom having occupied and unoccupied portions disposed above the second horizontal section of the chassis, and a living room disposed above the third section of the chassis, wherein the main housing includes a first longitudinally disposed vertical wall having an opening that extends into the bedroom and bathroom; and
   a slide-out housing disposed within the opening of the first vertical wall of the main housing, wherein the slide-out housing comprises a longitudinally disposed vertical wall and a plurality of laterally disposed horizontal walls extending from the vertical wall so as to define an auxiliary space therein, wherein the slide-out assembly is moveable between (a) a retracted position such that the vertical wall of the slide-out housing is substantially aligned with the first vertical wall of the main housing and the unoccupied portions of the bedroom and bathroom are reduced, and (b) a deployed position such that the vertical wall of the slide-out housing is outwardly disposed with respect to the first vertical wall of the main housing, wherein the auxiliary space includes a bedroom section disposed adjacent the bedroom and a bathroom section disposed adjacent the bathroom, wherein the bedroom section comprises a wardrobe closet and the bathroom section comprises a fixture such that deploying the slide-out housing displaces the wardrobe closet away from the bedroom and displaces the fixture away from the bathroom so as to increase the unoccupied portions of the bedroom and bathroom.

* * * * *